United States Patent
Andree et al.

(10) Patent No.: US 9,578,207 B1
(45) Date of Patent: Feb. 21, 2017

(54) SYSTEMS AND METHODS FOR SELECTIVELY SCREENING IMAGE DATA

(71) Applicant: CSR IMAGING US, LP, Burlington, MA (US)

(72) Inventors: Fred William Andree, Brookline, MA (US); Sung-Chu Lee, Taipei (TW); Neil Brad Epstein, Sudbury, MA (US)

(73) Assignee: CSR IMAGING US, LP, Burlington, MA (US)

( * ) Notice: Subject to any disclaimer, the term of this patent is extended or adjusted under 35 U.S.C. 154(b) by 0 days.

(21) Appl. No.: 14/871,149

(22) Filed: Sep. 30, 2015

(51) Int. Cl.
| | |
|---|---|
| *H04N 1/46* | (2006.01) |
| *H04N 1/60* | (2006.01) |
| *H04N 1/52* | (2006.01) |
| *H04N 1/405* | (2006.01) |
| *H04N 1/40* | (2006.01) |
| *H04N 1/58* | (2006.01) |

(52) U.S. Cl.
CPC ............ *H04N 1/52* (2013.01); *H04N 1/40018* (2013.01); *H04N 1/40062* (2013.01); *H04N 1/58* (2013.01); *H04N 1/6005* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 5,333,064 A | * | 7/1994 | Seidner | G06T 3/4007 358/3.08 |
| 5,343,309 A | * | 8/1994 | Roetling | H04N 1/40075 358/3.07 |
| 5,426,500 A | * | 6/1995 | Ohana | G01J 1/4257 33/288 |
| 5,471,543 A | * | 11/1995 | Ng | H04N 1/4058 358/3.14 |
| 5,852,678 A | * | 12/1998 | Shiau | H04N 1/40062 358/462 |
| 6,101,285 A | * | 8/2000 | Fan | G06T 5/20 358/3.08 |
| 6,285,800 B1 | | 9/2001 | Yamazaki et al. | |
| 6,501,856 B2 | * | 12/2002 | Kuwano | G06K 9/325 348/E5.1 |

(Continued)

OTHER PUBLICATIONS

International Search Report and Written Opinion—PCT/US2016/044412—ISA/EPO—Oct. 14, 2016.

*Primary Examiner* — Madelein Nguyen
(74) *Attorney, Agent, or Firm* — Procopio, Cory, Hargreaves & Savitch LLP

(57) ABSTRACT

Various embodiments are directed to methods, systems, and devices for improving the quality of image data for printing by a printer having relatively low resolution capabilities. Image data may be scanned, captured or otherwise received. The image data may be received in bands, chunks, blocks, portions, regions, or its entirety. An edge detector is subsequently employed to detect a location of edges in a region of the received image data. For image data pixels that are located in or close to a detected edge, a first screen is applied to modify these pixels to compensate for printing at or near the detected edge. Otherwise, a second image screen is applied to modify pixels for printing that are not close to a detected edge. The first screen may be an error diffusion screen or a threshold screen. The second screen may be a halftone screen.

20 Claims, 15 Drawing Sheets

(56) References Cited

U.S. PATENT DOCUMENTS

| | | | |
|---|---|---|---|
| 6,608,942 B1 * | 8/2003 | Le | G06T 5/002 382/199 |
| 6,697,537 B2 * | 2/2004 | Norimatsu | G06T 5/20 358/520 |
| 6,864,994 B1 * | 3/2005 | Harrington | H04N 1/40075 358/1.9 |
| 7,385,729 B2 * | 6/2008 | Clark | G06K 15/02 358/1.9 |
| 8,335,396 B2 * | 12/2012 | Yamada | G06T 5/003 358/3.27 |
| 8,599,439 B2 * | 12/2013 | Yu | G06T 5/20 358/1.15 |
| 8,634,105 B2 * | 1/2014 | Yu | H04N 1/6058 358/1.9 |
| 9,070,011 B2 * | 6/2015 | Andree | G06K 9/00456 |
| 2003/0185420 A1 * | 10/2003 | Sefcik | G06K 9/3241 382/103 |
| 2004/0135926 A1 * | 7/2004 | Song | H04N 7/012 348/448 |
| 2006/0087695 A1 | 4/2006 | Keithley et al. | |
| 2006/0221417 A1 * | 10/2006 | Fujieda | G06K 9/2072 358/538 |
| 2007/0223044 A1 * | 9/2007 | Bailey | G06K 15/02 358/3.06 |
| 2008/0218803 A1 | 9/2008 | Murakami | |
| 2009/0016567 A1 * | 1/2009 | Aiso | H04N 1/0044 382/100 |
| 2010/0053638 A1 * | 3/2010 | Murayama | G03G 15/5058 356/620 |
| 2011/0135156 A1 * | 6/2011 | Chen | G06K 9/325 382/105 |
| 2011/0274353 A1 * | 11/2011 | Yu | G06K 9/00664 382/173 |
| 2011/0292451 A1 * | 12/2011 | Harvill | H04N 1/54 358/3.03 |
| 2014/0071129 A1 * | 3/2014 | Lehtinen | G06T 15/50 345/426 |
| 2016/0094782 A1 * | 3/2016 | Tay | H04N 5/23212 382/255 |
| 2016/0277645 A1 * | 9/2016 | Bitouk | H04N 5/147 |

* cited by examiner

SYSTEMS AND METHODS FOR SELECTIVELY SCREENING IMAGE DATA

TECHNICAL FIELD

The present invention relates generally to printing image data, and more particularly, but not exclusively, to applying separate screens to separate regions of image data based on features included in the image data.

BACKGROUND

The printed quality of high-resolution image data can suffer when printed with relatively low-resolution printing devices. For example, when an image is printed for a relatively low resolution newspaper, book, or magazine, such printing devices often clump the ink or toner pixels into clusters (dots) at an edge. Screening of high-resolution image data has been employed to reduce its pixel depth and to cluster the "on" pixels into dots. In such applications, halftone screens reproduce solid, smooth, or slowly changing regions of the image data well, but may render printed edges (and other discontinuous regions) as fuzzy or jagged structures. Clustered dot halftone dots usually have between 4×4 and 10×10 output pixels per halftone dot. In other words the resolution of the dots is much less than the basic output resolution. This lower resolution is very visible at edges. In contrast, error diffusion screens or threshold screens render edges sharp and well defined in part because these screens generates edges at the higher output pixel resolution.

Half tone screening of image data is employed to reduce the pixel bit depth of digital image data. For instance, a halftone screen may be applied to simulate continuous tones in an image that is represented with screened image data that includes pixels of a bit depth of a single bit. In some halftone images, a pixel's single bit is either completely on or completely off. Dots of various amplitudes and frequencies may be clustered, via pixels of a 1-bit pixel depth, to render certain features in the screened image data. Such halftone screens are often applied when printing images for books, magazines, newspapers and the like. However, details of image data that are represented by screened image data are often lost due to lower cluster dot resolution than output pixel resolution. Thus, it is with respect to these considerations and others that the following disclosure is provided.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
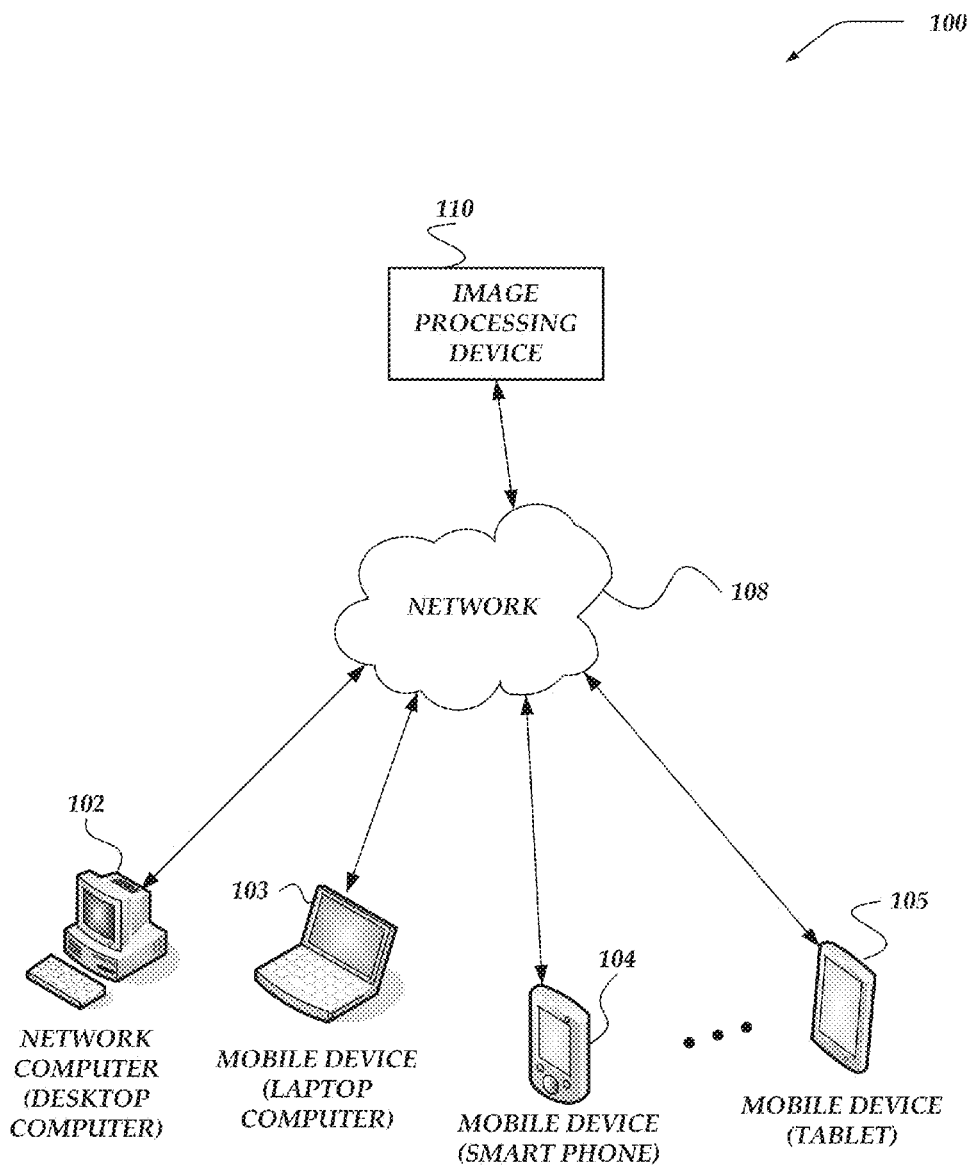
FIG. 1 is a system diagram of an environment in which embodiments of the invention may be implemented.

Various embodiments are described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may be entirely hardware embodiments, entirely software embodiments, or embodiments combining software and hardware aspects. The following detailed description should, therefore, not be limiting.

Throughout the specification and claims, the following terms take the meanings explicitly associated herein, unless the context clearly dictates otherwise. The term "herein" refers to the specification, claims, and drawings associated with the current application. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "channel" may refer to either a chrominance channel (color) or luma (brightness) channel in a color model. In various embodiments, a "color model" is a mathematical model that describes how colors and/or luminance may be represented in an n-tuple, wherein each element in the n-tuple corresponds to a channel.

As used herein, the term "color space" may refer to a set of one or more channels that may be used in combination to represent various different colors of the visible light spectrum and/or grayscales. At least some of the channels included in a particular color space may be chrominance channels. Each chrominance channel may be a different color in the color space. For instance, two exemplary embodiments of a color space is the Red Green Blue (RGB) color space and the Cyan Magenta Yellow Key (Black) (CMYK) color space.

A color value (or tone) may be a numerical representation of a brightness intensity (or color spectrum) for a color channel, which may include a color spectrum represented by a numerical value. As used herein, a color channel and color value may be represented by the nomenclature red(x), green (y), and blue(z), where x, y, and z are the color values for the corresponding color channel. Thus, a color value may be included as an element in the n-tuple of a color model.

At least one of the channels included in a particular color space may be a luma channel. For instance, a YUV color space may include one luma channel (Y) and two chrominance channels (UV). Examples of a YUV color space include, but are not limited to, YPbPr, YCbCr, and the like.

As used herein, the term "additive color space" may refer to a color space that includes a plurality of chrominance channels that are mixed to add (transmit or reflect) wavelengths in order to represent the various different colors of the visible light spectrum. The RGB color space may be an additive color space.

As used herein, the term "subtractive color space" may refer to a color space that includes a plurality of chrominance channels that are mixed to subtract (absorb) wavelengths of the spectrum in order to represent the various different colors of the visible light spectrum. The CMYK color space may be a subtractive color space.

As used herein, the terms "image data" or "data" refer to a numeric representation of a two-dimensional image. In the various embodiments, image data may be raster image data and include a plurality of pixels.

As used herein, the term "pixel" may refer to a discreet region of the image data, wherein each pixel maps to or otherwise corresponds to a unique location in the two-dimensional image that is represented by the image data. In various embodiments, the image data is two-dimensional image data and includes a two-dimensional array of pixels (M×N), where M and N are positive integers. M may refer to the number of pixels in a horizontal line of pixels and N refers to the number of pixels in a vertical row of pixels. Equivalently, M may refer to the number of vertical rows of pixels and N refers to the number of horizontal lines of pixels in the image data.

As implied by the (M×N) notation associated with a two-dimensional array of pixels of image data, a relative geometric or spatial relationship exists between any two pixels. For instance, a distance may be defined between any two pixels of the image data. A distance may be determined as the two-dimensional Euclidean distance between the two pixels, and any other such metric, in the units of pixel distance. An x-y Cartesian integer coordinate system may be employed to describe relative positioning of a pixel, via a two dimensional index associated with the pixel.

Accordingly, a first pixel may be indexed as (a, b), where a and b are integers, $0 \leq a \leq M-1$, and $0 \leq b \leq N-1$. A second pixel may be indexed as (x, y), where x and y are integers, $0 \leq x \leq M-1$, and $0 \leq y \leq N-1$. The first and second pixels are "contiguous pixels" if and only if $(((a \neq x) \| (b \neq y)) \&\& ((|a-x| \leq 1) \&\& (|b-y| \leq 1)))$, where && is the logical AND operator and $\|$ is the logical OR operator.

As used herein, the term "region of image data" may refer to subsets of pixels in the image data, wherein each pixel in the subset is contiguous with at least one other pixel of the subset. The term "region of image" is similarly defined in reference to the image represented by the image data.

Image data may be represented in one or more color spaces. In a representation by a particular color space, each pixel of the image data includes an n-tuple of pixel values, where n is a positive integer and the particular color space includes n channels. Each element in the n-tuple corresponds to a unique channel in the color space. For instance, in a representation in the RGB color space, a particular pixel of the image data may include the 3-tuple (x, y, z), where x, y, and z are pixel values and represent the color value (intensity) of the Red, Green, and Blue channels respectively. Each of x, y, and z is a "pixel value." In various embodiments, x is the Red channel pixel value, y is the Green channel pixel value, and z is the Blue channel pixel value.

In various embodiments, image data may be represented in a color space that includes only a single luma or a single chrominance channel. For instance, a grayscale image may be represented by image data that includes only a single luma channel.

A representation of the image data in a second color space may be generated based on the representation of the image data in the first color space. The image represented by the image data in the first color space may be similar to the image represented by the image data in the second color space. For instance, image data may be represented in a RGB color space. The RGB representation may be converted to a CMYK representation of the image data, resulting in a similar image.

As used herein, the term "pixel resolution" refers to a count or relative density of the discreet pixels included in the image data. For instance, as discussed above, a pixel resolution may be indicated by (M×N), where M and N are positive integers.

As used herein, the term "channel depth" refers to the least number of bits required to represent each of the discreet pixel values of each element corresponding to a single channel in the n-tuple of a pixel. For instance, a red channel depth of 8-bits indicates that the discreet color values corresponding to the red channel may include up to 256 quantized values. In the above example, the channel depth of the Red channel is the minimum number of bits required to quantize each of the discreet pixel values that x may take on.

As used herein, the term "pixel depth" refers to the least number of bits required to represent each of the discreet pixel values in the n-tuple corresponding to all the channels of a pixel. For instance, for a pixel that includes a red channel depth of 8-bits, a green channel depth of 8-bits, and a blue channel depth of 8-bits, the pixel depth is 24-bits. Such a pixel provides $2^{24}$=16 M discreet colors. The pixel depth is the minimum number of bits required to quantize each of the discreet pixel values that the pixel value n-tuple (x, y, z) may take on.

As used herein, the term "color profile" may refer to a color value for each separate channel within a color space. For instance, the color profile of a pixel, may be represented in a color space by the n-tuple of that color space. In an RGB color space, the pixel's color profile may be represented by (34, 233, 122), where 23, 233, and 122 are the color values (pixel values) for the Red, Green, and Blue channels. Accordingly, the color profile may include the pixel value n-tuple (x, y, z) from the above example.

As used herein, the terms "image data" and "screened image data" refer to two associated sets of image data, where the pixel depth of the screened image data is less than the pixel depth of the image data. The terms "data" and "screened data" may refer to the two associated sets of image data. The screened image data may be generated from the image data via an image data screening process for example, a halftone screening process, an error diffusing screening process, or a threshold screening process.

The image data screening process reduces the pixel depth of the image data. For instance, the screened image data may be generated by applying one or more screens to the pixels of the image data. The term "data" may be used interchangeably with "image data." Likewise, the term "screened data" may be used interchangeable with "screened image data."

In at least one embodiment, the image data may be image data that was screened from another image data set that was more (greater pixel depth) than the image data. As such, another screening process is applied to the data so that the screened image data has been iteratively screened. In some embodiments, the image data may be pre-screened image data.

The image data and the screened image data may be represented by separate color spaces. As such, the terms "image data color space" and "screened image data color space" refer to the color space of the image data and the screened image data respectively. The image data color space may include more, less, or an equivalent number of channels than the screened image data color space. Individual channel depths of the screened image data may be less than the individual channel depths of the image data.

Other embodiments are not so constrained. The image data and the screened image data may be represented in the same color space.

In some embodiments, the image data color space may be an additive color space, such as the RGB color space. In at least one embodiment, the screened image data color space may be a subtractive color space, such as the CMYK color space. For instance, the image data may be suitable for display on an electronic display device such as a monitor. The screened image data may be suitable for printing on paper via a printing device and ink. In at least one embodiment, both the image data and the screened image data are represented in a grayscale color space.

The term "image" refers to the image represented by the image data and the term "screened image" refers to the image represented by the screened image data. The screened image is similar to or resembles the data, but includes less detail due to quantization errors induced during the reduction of pixel depth. The screened image is also noisier and coarser, due to the requirement to cluster "on" pixels. The image may be a continuous tone or contone image. The screened image may be a halftone image or another such quantized image.

As used herein, the term "pixels" refer to the pixels included in the image data and the term "screened pixels" refer to the pixels included in the screened image data. Unless the pixel resolution is changed between the image data and the screened image data, there is a one-to-one correspondence between the pixels and the screened pixels.

The pixel depth of the screened pixels is less than the pixel depth of the corresponding pixels. In some embodiments, the channel depth of the screened pixels is less than the channel depth of the corresponding pixels. In various embodiments, the channel depth of each channel of each screened pixel is reduced to a depth of one (1), i.e. the channel of the screened pixel is either fully "on" or fully "off," with no gradients of brightness. The depth of the channel has been quantized to two states, i.e. the screened channel is a binary channel. In other embodiments, the channel depth of the screened pixels is a 2-bit depth. Although, other embodiments are not so constrained, and the screened pixels can take on an pixel or channel depth that is less than the pixel depth.

It should be noted that the actual representation of both the pixels and the screened pixels may include the same number of bits. For instance, each channel of both the input and the screened bits may be represented by 8 bits. However, the pixel values may take on each integer value between 0 and 255, while the screened pixels of a channel depth of 1-bit may only take on the values of 0 (fully on) and 255 (fully off) or vice versa in a subtractive color space.

The term "pixel values" may refer to the pixel values of the elements of the pixel n-tuples in the image data. Likewise, the term "screened pixel values" may refer to the pixel values of the elements of the pixel n-tuples in the screened image data. As discussed above, in various embodiments, where the channel depth of the screen pixel has been reduced to a depth of 1 bits, the screened pixel values are quantized to two values. One of the two values represents a fully "on" state and the other value represents a fully "off" state.

As used herein, the term "screen" refers to a component, module, operator, kernel, matrix, two dimensional threshold array, or the like that is applied to or operates on one or more pixels to generate screened pixels. The screened pixels include a pixel depth that is less than the pixel depth of the pixels. A separate screen may be applied to each of the channels of the pixels. For instance, in the a CMYK representation of the data, a cyan screen may be applied to the cyan channel, a magenta screen may be applied to the magenta channel, a yellow screen may be applied to the yellow channel, and a black screen may be applied to the key channel.

A screen may include an operator or a kernel that operates on one or more pixels of the image data. An operator or kernel may include a matrix that operates on pixels that correspond to the matrix elements within the matrix operator or kernel.

The screen for a particular channel may operate on the pixel values of the particular channel ("channel pixel values") to determine "screened channel pixel values," with a reduced number of discretized values. For instance, for an embodiment where the luma channel of the pixels includes a depth of 8-bits, the channel pixel values may take on 256 discrete values, ranging between 0 and 255. After the luma channel screen is applied to the pixel, where the luma channel depth is reduced to a single bit, the screened channel pixel values may take on 2 discrete values, representing on or off states.

Some screens may be "point conversion screens," where the screened channel pixel values for a particular screened pixel are dependent only on the particular screen and the channel pixel values for the corresponding pixel, but are not dependent on neighboring pixels. Such point conversion screens may include, but are not limited to thresholding (with constant, dynamic, or random threshold values), random dithering, patterned dithering, or ordered dithering. Embodiments of ordered dithering screens include clustered dot screens, such as halftone screens. Embodiments of ordered dithering also include dispersed dot screens, such as Bayer screens, void and cluster screens (blue noise), and the like.

Other embodiments include screens where the screened pixel value for a particular screened pixel is dependent on the particular screen, the pixel values for the corresponding pixel, and the pixel values for pixels near the corresponding pixel. Such screens may involve "neighborhood operations" or "area operation." Similarly, such screens may include "neighborhood operators" or "area operators." For instance, a screen may be an error diffusion screen. Embodiments of error diffusion screens include, but are not limited to various Floyd-Steinberg screens, Jarvis-Judice-Ninke screens, Stucki screens, Burkes screens, Sierra screen, two-row Sierra screens, fliter life screens, Atkinson screens, and the like.

As used herein, the term "discontinuous feature" refers to a feature of either image data or the image represented by the image data. Examples of discontinuous features include, but are not limited to edges, corners, ridges, valleys, features that include quickly changing color or luminance, and the like. Discontinuous features may be features that are sharply defined in the image data or the image represented by the image data. Discontinuous features may include high-contrast features. As used herein, the term "discontinuous" refers to discontinuities or steep changes (across a relatively small region of the image data) in the pixel values in one or more channels. The discontinuous features of interest are edges or boundaries, and not isolated noisy pixels.

Discontinuous features may be associated with large changes in the pixel values of pixels included in or near the discontinuous features. Specifically, the pixel values in at least one of the channels of pixels included in or near the discontinuous feature are associated with a large gradient in the pixel values. In this context, a large gradient may be defined by a predetermined or dynamic gradient threshold value. For instance, if the pixel value gradient in at least one channel in a region of the image data exceeds the gradient threshold value, a discontinuous feature is associated with the region of the image data and the corresponding region of the represented image. The pixel value gradient may be determined in one or more channels of the image data. The pixel value gradient may be a combination of variances in one or more directions within the represented image, such as a combination of a pixel value differential in a horizontal direction and a vertical direction of the image. A gradient threshold may be a second screen threshold.

Discontinuous features may be associated with one or more channels of the image data. For instance, a feature may be a discontinuous feature in one channel of the image data (such as the red channel) but may not be a discontinuous feature in another channel (such as the green channel). At least some discontinuous features may be discontinuous features in each of the channels of a particular color space.

As used herein, the term "discontinuous region" of the image data (or the image represented by the image data) may refer to a region of the image data (or the represented image) that include at least one discontinuous feature. In some embodiments, a discontinuous region is a contiguous region, wherein every pixel in the discontinuous region has a gradient, as measured by an edge detector, of at least a threshold value.

As used herein, the terms "continuous region" of the image data (or the image represented by the image data) may refer to a region of the image data (or the represented image) that does not include any discontinuous features of the discontinuous features of the image data. As used herein, the term "continuous" refers continuous, or slowly changing, pixel values in at least one channel. As such, continuous regions include relatively solid, or smoothly textured, regions of the image data or the image represented by the image data.

As used herein, the term "discontinuous pixel" may refer to an image data pixel or an image pixel that is within a discontinuous region of the image data or image. Likewise, the term "continuous pixel" may refer to image data pixel or an image pixel that is within a continuous region of the image data or the image. The term "discontinuous screen" may refer to one or more screens that are employed to determine the screened pixel values for one or more discontinuous pixels. Likewise, the term "continuous screen" may refer to one or more screens that are employed to determine the screened pixel values for one or more continuous pixels.

As used herein, the term "discontinuous feature detector" may refer to any operator, module, component, kernel, or the like that is operative to detect discontinuous features in image data. As such, a discontinuous feature detector may be an edge detector, a corner detector, a ridge detector, a valley detector, and the like.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to methods, systems, and devices for improving the quality of image data for printing by a printer having relatively low resolution capabilities. Image data may be scanned, captured or otherwise received. The image data may be received in bands, chunks, blocks, portions, regions, or its entirety. An edge detector is subsequently employed to detect a location of edges in a region of the received image data. For image data pixels that are located in or close to a detected edge, a first screen is applied to modify these pixels to compensate for printing at or near the detected edge. Otherwise, a second image screen is applied to modify pixels for printing that are not close to a detected edge.

In one of the various embodiments, the first screen is an error diffusion screen. In another embodiment, the first screen may be a threshold screen. Error diffusion screens and/or threshold screens that are applied to image data pixels tend to render detected edges for printing in sharp and defined detail. In the first screened image data, pixels in or near the edges are clustered on the dark side of the edge to render sharp and defined detail for printing by a printing device.

In one of the various embodiments, the second screen is a halftone screen that is applied to image data pixels that are not located near detected edges. Pixels that are not in or near an edge are generally located in the solid, smooth, or slowly changing regions of the image data. The second (halftone) screen renders these pixels with adequate detail for printing even though the pixels are clustered into dots that may or may not vary in size. Accordingly, in the second screened image data, the pixels not in or near edges are clustered in dots for the solid, smooth, or slowly changing regions of the image data.

The various embodiments generate screened image data by selectively associating separate screens to separate regions of the image data to be screened (the image data). The selective association of separate screens to separate regions of the image data is based on the location of discontinuous features included in the image data. The generated screened image data is subsequently provided to a relatively low-resolution printing device for printing. For example, the first and second screened image data may be subsequently employed to print substantially half-tone images that also provide relatively sharp and defined detail at any edges.

The various embodiments employ a discontinuous feature detector, such as an edge detector, to locate discontinuous features, such as edges, in the image data. Pixels that are included in, or near, a discontinuous feature of the image data are selectively associated with a first screen. Pixels included in the solid or slowly changing (smooth) regions of the image data are selectively associated with a second screen. At least in some embodiments, more than two screens are selectively associated with separate regions of the image data based on the locations of continuous features.

In various embodiments, the first screen (that is selectively associated with discontinuous features in the image data) includes an error diffusion screen, or some other screen, such as a threshold screen, that tends to sharply reproduce discontinuous features in the generated screened image data. Also in various embodiments, the second screen (that is selectively associated with the smooth or solid regions of the image data) includes a halftone screen, or some other screen that tends to cluster dots in the generated screened image data.

To determine the screened pixels values for a screened pixel that corresponds to a particular pixel, the screen that is selectively associated with the particular pixel is applied to the particular pixel. For instance, the screened pixel values for a screened pixel are determined based on the screen that is selectively associated with and applied to the particular pixel that corresponds to the screened pixel and the pixel values of the particular pixel. In some embodiments, the determination of the screened pixel values is further based on the pixel values included in pixels that are located near, or are otherwise neighboring pixels of the particular pixel. The screened image data is generated based on the screened pixel values.

The second screen may include an operator, such as a halftone operator that when applied to a particular pixel that is associated with the screen, operates on the particular pixel. When operated on, screened pixel values are determined. The screened pixel values are based on the second screen and the pixel values of the particular pixel. In some embodiments, the second screen operates on the associated pixels in a pointwise operation, e.g. the screening of a particular pixel is not affected by the particular pixel's neighboring pixels.

The first screen may be based on a modification of the second screen, such as a modification of parameters of the second screen. In other embodiments, the first screen is a completely separate screen from the second screen. The pixel depth of the screened image data may be less than the pixel depth of the image data. Accordingly, the application of a screen to an associated pixel determined screened pixel values that are at a reduced pixel depth compared to the corresponding pixels.

In some embodiments, the first screen includes an operator, such as an error-diffusing operator, that performs a neighborhood operation on the associated pixels, rather than just a pointwise operation, to determine screened pixel values. The neighborhood operation diffuses or distributes (to neighboring pixels) the quantization round off errors inherit to reducing the pixel depth of the image data. This diffusion of round off errors to neighboring pixels (that are included in or near discontinuous features) results in screened image data that sharply renders discontinuous features, such as edges, ridges, valleys, and the like, located in the image data. For instance, in the screened image, pixels near the edges will be clustered on the dark side of the edge, such that the edge does not appear fuzzy, hazy, or jagged.

As noted above, the screens are selectively associated with pixels based on the locations of discontinuous features in the image data. Accordingly, the generated screened image data tends to sharply render discontinuous features, such as the boundaries between objects, in the image data. Furthermore, the dots in the generated screened image tend to be clustered, which may be required for reproducing the screened image via certain types of printing technology, e.g. laser printers.

In at least one embodiment, the first screen includes a threshold screen that includes a pointwise operator. The threshold screen may apply a simple, predetermined threshold to each pixel that the first screen is associated with. Threshold screens also tend to generate screened image data that sharply render discontinuous features. In some embodiments, a weighted combination of the first and the second screen is associated with each of the pixels of the image data. The particular weighted combination of the first and the second screen associated with a particular pixel is based on the gradient at the pixel.

As noted above, in some embodiments, the discontinuous feature detector employed to locate discontinuous features in the image data is an edge detector. In at least such embodiments, the image data may already be a scan of a previously halftone screened image or document. A halftone detector may be used to determine the resolution of the original halftone. A coarseness of an edge detection filter is determined based on the resolution of the original halftone.

For instance, the image data may have already been partially or pre-screened. One or more edge detection kernels may be determined based on the coarseness of the edge detection filter. For example, if the image data has not been pre-screened, a 3×3 Sobel edge kernel may be determined. If the image has been partially or pre-screened, a 5×5, or larger Sobel edge kernel may be determined. The edges in the image data are located based on the edge kernels and the pixel values.

One of the edge kernels may be a vertical edge kernel that is operative to determine vertical gradients in the image data. Determining the vertical gradients may be based on a convolution of the vertical edge kernel with the pixel values included in the pixels.

One of the edge kernels may be a horizontal edge kernel that operative to determine horizontal gradients in the image data. Determining the horizontal gradients may be based on a convolution of the horizontal edge kernel with the pixel values.

In various embodiments, gradient magnitudes are determined based on a quadratic combination of the horizontal and vertical gradients. For instance, the horizontal and vertical gradients may be added in quadrature. The discontinuous features are determined based on the gradient magnitudes. If the gradient magnitude at a particular pixel is greater than one or more gradient thresholds, the particular pixel may be included in a discontinuous feature. Otherwise, the particular pixel is not included in a discontinuous feature. A second screen threshold may be a gradient threshold.

The gradient thresholds may be predetermined or dynamically determined. In at least one embodiment, a gradient threshold may be automatically determined based on a channel value, a higher order pixel value differential, or the like. In at least one embodiment, a user may provide the one or more gradient thresholds. Various embodiments include a preview feature. The preview feature may display to the user, the screened image represented by the generated screened image data. As such, the user may preview the screened image to determine if the one or more gradient thresholds should be updated, modified, or held constant. Accordingly, a user may provide feedback to the screening process. A separate gradient threshold may be applied to each channel of the image data.

In various embodiments, to locate the discontinuous features in the image data, discontinuous feature detector may be employed in one or more channels of the image data, such as the luma channel. A representation of the image data that includes a luma channel may be generated.

In some embodiments, the image data is captured in an additive color space, such as the RGB color space. Another representation of the image data may be generated in a subtractive color space, such as the CMYK color space. The screened image data may be generated in the subtractive color space, by applying a separate screen to each of the Cyan, Magenta, Yellow, and key channels.

Illustrative Operating Environment

FIG. 1 shows components of one embodiment of an environment in which various embodiments of the invention may be practiced. Not all of the components may be required to practice the various embodiments, and variations in the arrangement and type of the components may be made without departing from the spirit or scope of the invention. As shown, system 100 of FIG. 1 may include image-processing device 110, network computer 102, mobile devices 103-105, and network 108.

At least one embodiment of mobile devices 103-105 is described in more detail below in conjunction with mobile device 200 of FIG. 2. Briefly, in some embodiments, mobile devices 103-105 may be configured to communicate with image-processing device 110 and/or other network computers.

At least one embodiment of network computer 102 is described in more detail below in conjunction with network computer 300 of FIG. 3. Briefly, in some embodiments, network computer 102 may be configured to communicate with image-processing device 110 and/or other network computers.

In some embodiments, at least some of mobile devices 103-105 and/or network computer 102 may operate over a wired and/or wireless network to communicate with other computing devices or image-processing device 110. Generally, mobile devices 103-105 and/or network computer 102 may include computing devices capable of communicating over a network to send and/or receive information, perform various online and/or offline activities, or the like. It should be recognized that embodiments described herein are not constrained by the number or type of remote computers employed, and more or fewer remote computers—and/or types of remote computers—than what is illustrated in FIG. 1 may be employed.

Devices that may operate as mobile devices 103-105 and/or network computer 102 may include various computing devices that typically connect to a network or other computing device using a wired and/or wireless communications medium. Mobile devices 103-105 may include portable computers, and network computer 102 may include non-portable computers, any of which may operate as client computers, server computers, or the like. Examples of network computer 102 may include, but is not limited to, desktop computers, personal computers, multiprocessor systems, microprocessor-based or programmable electronic devices, network PCs, or the like, or integrated devices combining functionality of one or more of the preceding devices. Examples of mobile devices 103-105 may include, but are not limited to, laptop computers (e.g., mobile device 103), smart phones (e.g., mobile device 104), tablet computers (e.g., mobile device 105), cellular telephones, display pagers, radio frequency (RF) devices, infrared (IR) devices, Personal Digital Assistants (PDAs), handheld computers, wearable computing devices, or the like, or integrated devices combining functionality of one or more of the preceding devices. As such, network computer 102 and/or mobile devices 103-105 may include computers with a wide range of capabilities and features.

Network computer 102 and/or mobile devices 103-105 may access and/or employ various computing applications to enable users to perform various online and/or offline activities. Such activities may include, but are not limited to, generating documents, gathering/monitoring data, capturing/manipulating images, managing media, managing financial information, playing games, managing personal information, browsing the Internet, or the like. In some embodiments, network computer 102 and/or mobile devices 103-105 may be enabled to connect to a network through a browser, or other web-based application.

Network computer 102 and/or mobile devices 103-105 may further be configured to provide information that identifies the remote computer. Such identifying information may include, but is not limited to, a type, capability, configuration, name, or the like, of the remote computer. In at least one embodiment, a remote computer may uniquely identify itself through any of a variety of mechanisms, such as an Internet Protocol (IP) address, phone number, Mobile Identification Number (MIN), media access control (MAC) address, electronic serial number (ESN), or other device identifier.

At least one embodiment of image-processing device 110 is described in more detail below in conjunction with image-processing device 400 of FIG. 4. Briefly, in some embodiments, image-processing device 110 may be a scanner or multi-function scanner/printer/copier/fax operative to at least scan images. In some embodiments, image-processing device 110 may be configured to communicate with one or more of network computer 102 and/or mobile devices 103-105. Image-processing device 110 may communicate with network computer 102 and/or mobile devices 103-105 via network 108.

In various embodiments, image-processing device is operative to screen image data. The image data may be provided to the image-processing device 110 by any networked device, including but not limited to one or more of network computer 102 and/or mobile devices 103-105. In various embodiments, image-processing device 110 may be a server computer device, such as a web-server. Accordingly, image-processing device 110 may provide image data screening services as a web-based service.

Network 108 may include virtually any wired and/or wireless technology for communicating with a remote device, such as, but not limited to, USB cable, Bluetooth, Wi-Fi, or the like. In some embodiments, network 108 may be a network configured to couple network computers with other computing devices, including network computer 102 and/or mobile devices 103-105, image-processing device 110, or the like. In various embodiments, information communicated between devices may include various kinds of information, including, but not limited to, processor-readable instructions, remote requests, server responses, program modules, applications, raw data, control data, system information (e.g., log files), video data, voice data, image data, text data, structured/unstructured data, or the like. In some embodiments, this information may be communicated between devices using one or more technologies and/or network protocols.

In some embodiments, such a network may include various wired networks, wireless networks, or any combination thereof. In various embodiments, the network may be enabled to employ various forms of communication technology, topology, computer-readable media, or the like, for communicating information from one electronic device to another. For example, the network can include—in addition to the Internet—LANs, WANs, Personal Area Networks (PANs), Campus Area Networks (CANs), Metropolitan Area Networks (MANs), direct communication connections (such as through a universal serial bus (USB) port), or the like, or any combination thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (ISDNs), Digital Subscriber Lines (DSLs), wireless links (including satellite links), or other links and/or carrier mechanisms known to those skilled in the art. Moreover, communication links may further employ any of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures and/or protocols—to enable information to be transferred from one network to another. In other embodiments, remote computers and/or other related electronic devices could be connected to a network via a modem and temporary telephone link. In essence, the network may include any communication technology by which information may travel between computing devices.

The network may, in some embodiments, include various wireless networks, which may be configured to couple various portable network devices, remote computers, wired networks, other wireless networks, or the like. Wireless networks may include any of a variety of sub-networks that may further overlay stand-alone ad-hoc networks, or the like, to provide an infrastructure-oriented connection for at least mobile devices 103-105. Such sub-networks may include mesh networks, Wireless LAN (WLAN) networks, cellular networks, or the like. In at least one of the various embodiments, the system may include more than one wireless network.

The network may employ a plurality of wired and/or wireless communication protocols and/or technologies. Examples of various generations (e.g., third (3G), fourth (4G), or fifth (5G)) of communication protocols and/or technologies that may be employed by the network may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra wide band (UWB), Wireless Application Protocol (WAP), user datagram protocol (UDP), transmission control protocol/Internet protocol (TCP/IP), any portion of the Open Systems Interconnection (OSI) model protocols, session initiated protocol/real-time transport protocol (SIP/RTP), short message service (SMS), multimedia messaging service (MMS), or any of a variety of other communication protocols and/or technologies. In essence, the network may include communication technologies by which information may travel between network computer 102, mobile devices 103-105, image-processing device 110, other computing devices not illustrated, other networks, or the like.

In various embodiments, at least a portion of the network may be arranged as an autonomous system of nodes, links, paths, terminals, gateways, routers, switches, firewalls, load balancers, forwarders, repeaters, optical-electrical converters, or the like, which may be connected by various communication links. These autonomous systems may be configured to self organize based on current operating conditions and/or rule-based policies, such that the network topology of the network may be modified.

Illustrative Mobile Device

Figure 2:
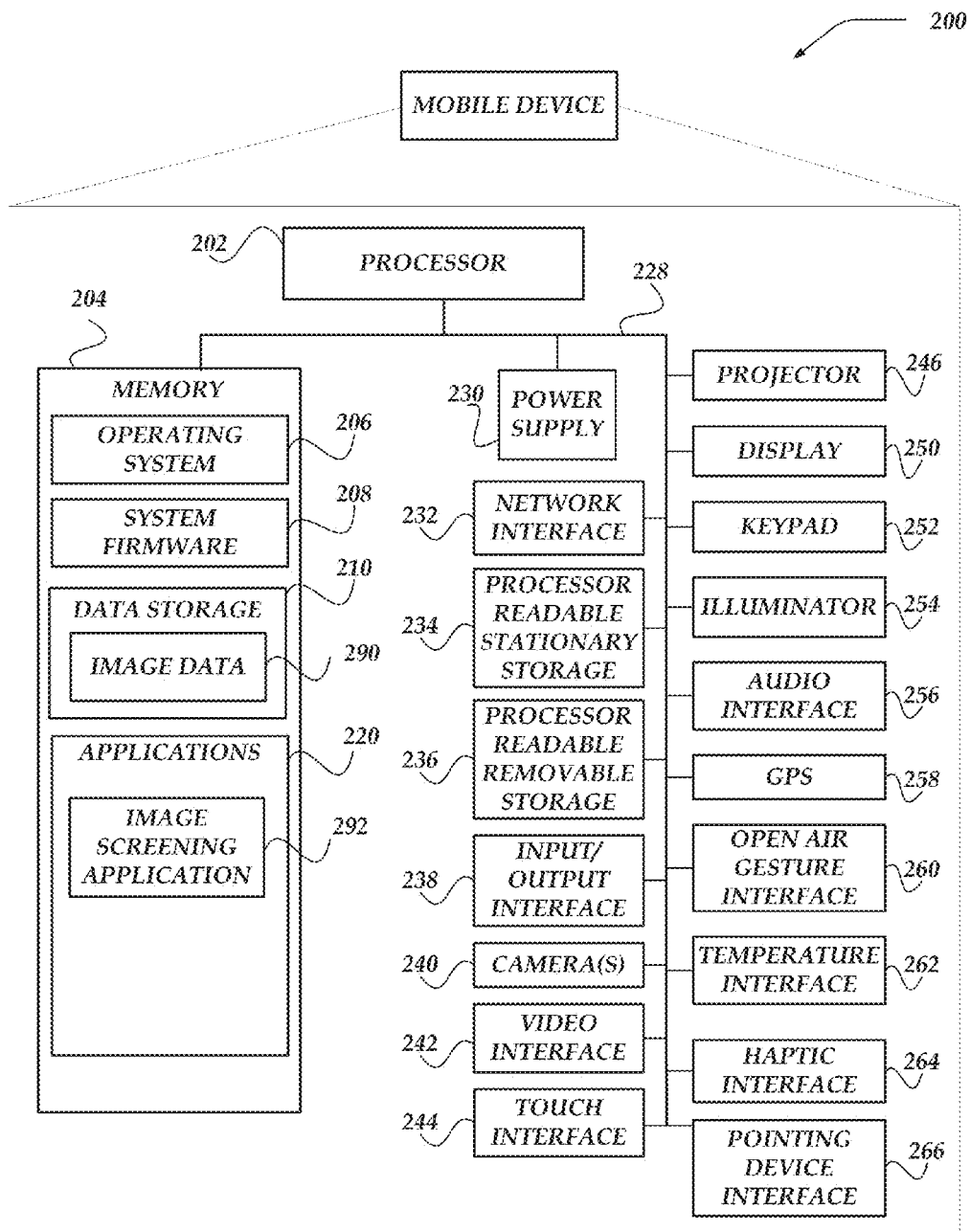
FIG. 2 shows an embodiment of a network computer that may be included in a system such as that shown in FIG. 1.

FIG. 2 shows one embodiment of mobile device 200 that may include many more or less components than those shown. Mobile device 200 may represent, for example, at least one embodiment of mobile device 103-105 shown in FIG. 1.

Mobile device 200 may include processor 202 in communication with memory 204 via bus 228. mobile device 200 may also include power supply 230, network interface 232, processor-readable stationary storage device 234, processor-readable removable storage device 236, input/output interface 238, camera(s) 240, video interface 242, touch interface 244, projector 246, display 250, keypad 252, illuminator 254, audio interface 256, global positioning systems (GPS) receiver 258, open air gesture interface 260, temperature interface 262, haptic interface 264, pointing device interface 266. Mobile device 200 may optionally communicate with a base station (not shown), or directly with another computer. And in one embodiment, although not shown, an accelerometer or gyroscope may be employed within mobile device 200 to measuring and/or maintaining an orientation of mobile device 200.

Power supply 230 may provide power to mobile device 200. A rechargeable or non-rechargeable battery may be used to provide power. The power may also be provided by an external power source, such as an AC adapter or a powered docking cradle that supplements and/or recharges the battery.

Network interface 232 includes circuitry for coupling mobile device 200 to one or more networks, and is constructed for use with one or more communication protocols and technologies including, but not limited to, protocols and technologies that implement any portion of the OSI model, GSM, CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of mobile device 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the mobile device is powered. Also, illuminator 254 may backlight these buttons in various patterns when particular actions are performed, such as dialing another mobile computer. Illuminator 254 may also cause light sources positioned within a transparent or translucent case of the mobile device to illuminate in response to actions.

Mobile device 200 may also comprise input/output interface 238 for communicating with external peripheral devices or other computers such as other mobile computers and network computers. Input/output interface 238 may enable mobile device 200 to communicate with one or more image-processing devices, such as image-processing device 110 of FIG. 1. Other peripheral devices that mobile device 200 may communicate with may include remote speakers and/or microphones, headphones, display screen glasses, or the like. Input/output interface 238 can utilize one or more technologies, such as Universal Serial Bus (USB), Infrared, Wi-Fi, WiMax, Bluetooth™, wired technologies, or the like.

Haptic interface 264 may be arranged to provide tactile feedback to a user of a mobile device. For example, the haptic interface 264 may be employed to vibrate mobile device 200 in a particular way when another user of a computer is calling. Temperature interface 262 may be used to provide a temperature measurement input and/or a temperature changing output to a user of mobile device 200. Open air gesture interface 260 may sense physical gestures of a user of mobile device 200, for example, by using single or stereo video cameras, radar, a gyroscopic sensor inside a computer held or worn by the user, or the like. Camera 240 may be used to track physical eye movements of a user of mobile device 200.

GPS transceiver 258 can determine the physical coordinates of mobile device 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of mobile device 200 on the surface of the Earth. It is understood that under different conditions, GPS transceiver 258 can determine a physical location for mobile device 200. In at least one embodiment, however, mobile device 200 may, through other components, provide other information that may be employed to determine a physical location of the mobile computer, including for example, a Media Access Control (MAC) address, IP address, and the like.

Human interface components can be peripheral devices that are physically separate from mobile device 200, allowing for remote input and/or output to mobile device 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a mobile computer with such peripheral human interface components is a wearable computer, which might include a remote pico projector along with one or more cameras that remotely communicate with a separately located mobile computer to sense a user's gestures toward regions of an image projected by the pico projector onto a reflected surface such as a wall or the user's hand.

A remote computer may include a browser application that is configured to receive and to send web pages, web-based messages, graphics, text, multimedia, and the like. The remote computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store system firmware 208 (e.g., BIOS) for controlling low-level operation of mobile device 200. The memory may also store operating system 206 for controlling the operation of mobile device 200. It will be appreciated that this component may include a general-purpose operating system such as a version of UNIX, or LINUX™, or a specialized mobile computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by remote computer 200 to store, among other things, applications 220 and/or other data. For example, data storage 210 may also be employed to store information that describes various capabilities of mobile device 200. The information may then be provided to another device or computer based on any of a variety of events, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of mobile device 200, including, but not limited to, non-transitory processor-readable removable storage device 236, processor-readable stationary storage device 234, or even external to the mobile device.

Data storage 210 may store documents 212 or other data files. Documents 212 may include one or more documents that may be editable by a user by employing document-processing application 222. In some embodiments, document-processing application 222 or another application (e.g., a web browser) may be utilized to forward, send, and/or otherwise transfer a document (or other file) to another computing device, such as image-processing device 110 of FIG. 1. In at least one such embodiment, the document may be transferred to the other computing device in its native file format (i.e., without first converting the documenting into another file format, such as an intermediate page description language). In various embodiments, data storage 210 may store image data 290. The stored image data 290 may be image data, screened image data, or any other such image data.

Applications 220 may include computer executable instructions which, when executed by mobile device 200, transmit, receive, and/or otherwise process instructions and data. Examples of application programs include, but are not limited to, calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

In some embodiments, applications 220 may include an image screening application 292 to screen image data and generated screened image data. For example, camera 240 may be employed to capture a image data. Image screening application 292 (or app) may be employed to screen the captured image data to generate screened image data in accordance with embodiments described herein. So, in some embodiments, mobile device 200 may be enabled to employ various embodiments, combinations of embodiments, processes, or parts of processes, as described herein.

Illustrative Network Computer

Figure 3:
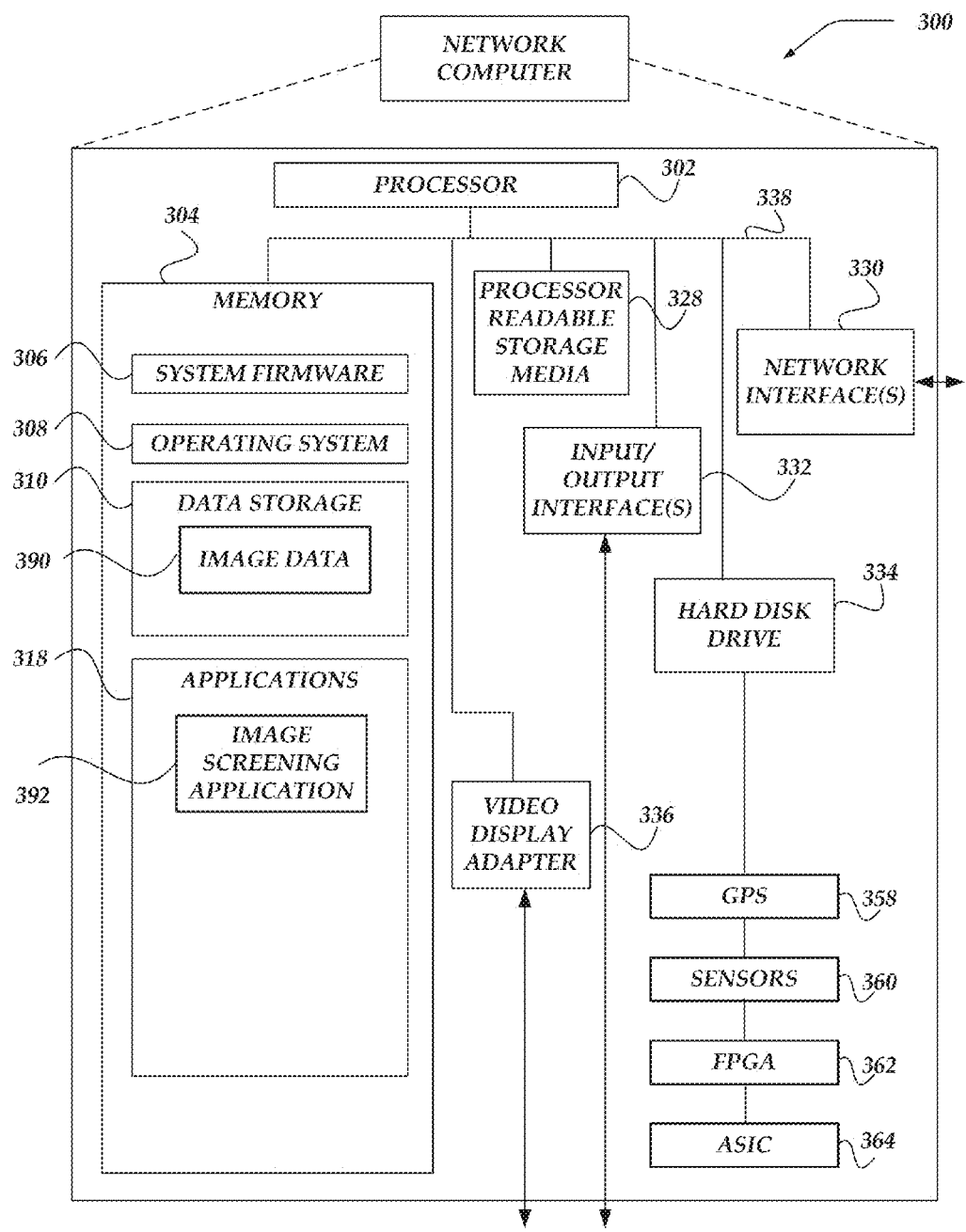
FIG. 3 shows an embodiment of a mobile device that may be included in a system such as that shown in FIG. 1.

FIG. 3 shows one embodiment of a network computer 300, according to one embodiment of the invention. Network computer 300 may include many more or less components than those shown. The components shown, however, are sufficient to disclose an illustrative embodiment for practicing the invention. Network computer 300 may be configured to operate as a server, client, peer, a host, or any other device. Network computer 300 may represent, for example network computer 102 of FIG. 1, and/or other network devices.

Network computer 300 includes processor 302, processor readable storage media 328, network interface unit 330, an input/output interface 332, hard disk drive 334, video display adapter 336, and memory 304, all in communication with each other via bus 338. In some embodiments, processor 302 may include one or more central processing units.

As illustrated in FIG. 3, network computer 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network computer 300 also comprises input/output interface 332 for communicating with external devices, such as a keyboard, image-processing device (e.g., image-processing device 110 of FIG. 1) or other input or output devices not shown in FIG. 3. Input/output interface 332 can utilize one or more communication technologies, such as USB, infrared, Bluetooth™, or the like.

Memory 304 generally includes RAM, ROM and one or more permanent mass storage devices, such as hard disk drive 334, tape drive, optical drive, and/or floppy disk drive. Memory 304 stores operating system 308 for controlling the operation of network computer 300. Any general-purpose operating system may be employed. System firmware 306 is also provided for controlling the low-level operation of network computer 300 (e.g., BIOS).

Although illustrated separately, memory 304 may include processor readable storage media 328. Processor readable storage media 328 may be referred to and/or include computer readable media, computer readable storage media, and/or processor readable storage device. Processor readable storage media 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Memory 304 further includes one or more data storage 310, which can be utilized by network computer 300 to store, among other things, applications 318 and/or other data. For example, data storage 310 may also be employed to store information that describes various capabilities of network computer 300. The information may then be provided to another device based on any of a variety of events, including being sent as part of a header during a communication, sent upon request, or the like.

Data storage 310 may also include a database, text, spreadsheet, folder, file, or the like, that may be configured to maintain and store user account identifiers, user profiles, email addresses, IM addresses, and/or other network addresses; or the like. Data storage 310 may further include program code, data, algorithms, and the like, for use by a processor, such as processor 302 to execute and perform actions. In one embodiment, at least some of data store 310 might also be stored on another component of network computer 300, including, but not limited to processor-readable storage media 328, hard disk drive 334, or the like. In various embodiments, data storage 310 may store image data 390. The stored image data 390 may be image data, screened image data, or any other such image data.

Applications 318 may include computer executable instructions, which may be loaded into mass memory and run on operating system 308. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth.

In some embodiments, applications 318 may include an image screening application 392 that may screen image data to generate screened image data in accordance with embodiments described herein. So, in some embodiments, network computer 300 may be enabled to employ various embodiments, combinations of embodiments, processes, or parts of processes, as described herein.

GPS transceiver 358 can determine the physical coordinates of the systems, transmitters, receivers, network computer 300, and the like on the surface of the Earth, which typically outputs a location as latitude and longitude values. GPS transceiver 358 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of transmitters and receivers on the surface of the Earth. It is understood that under different conditions, GPS transceiver 358 can determine a physical location for network computer 300. In at least one embodiment, however, network computer 300 may, through other components, provide other information that may be employed to determine a physical location of the systems, including for example, a Media Access Control (MAC) address, IP address, and the like.

In addition to GPS transceiver 358, network computer 300 may include other sensors 360 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors 360 may be one or more hardware sensors that collect and/or measure data that is external to network computer 300.

The network computer 300 may include an embedded logic hardware device instead of a CPU. The embedded logic hardware device would directly execute it's embedded logic to perform actions, e.g., an Application Specific Integrated Circuit (ASIC) 364, Field Programmable Gate Array (FPGA) 364, and the like.

Also, in one or more embodiments, the network computer 300 may include a hardware microcontroller instead of a CPU. In at least one embodiment, the microcontroller would directly execute its own embedded logic to perform actions and access it's own internal memory and it's own external Input and Output Interfaces (e.g., hardware pins and/or wireless transceivers) to perform actions, such as System On a Chip (SOC), and the like.

Illustrative Image-Processing Device

Figure 4:
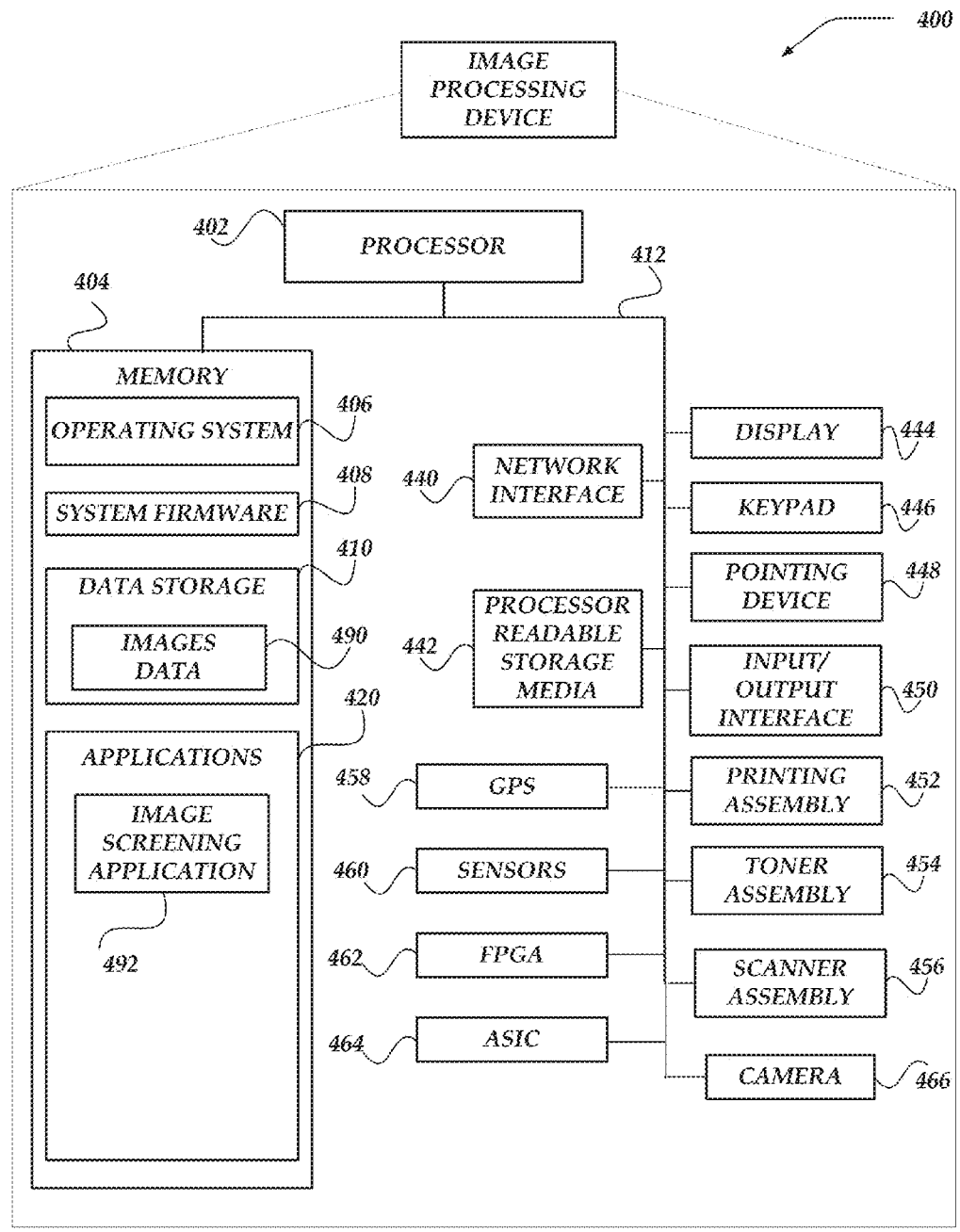
FIG. 4 shows an embodiment of an image-processing device that may be included in a system such as that shown in FIG. 1.

FIG. 4 shows one embodiment of image-processing device 400 that may be included in a system implementing the invention. Image-processing device 400 may include many more or less components than those shown in FIG. 4. However, the components shown are sufficient to disclose an illustrative embodiment for practicing the present invention. Image-processing device 400 may represent, for example, image-processing device 110 of FIG. 1. In various embodiments, image-processing device 400 may be employed to perform various embodiments described herein, including processes or parts of processes 600, 640, 700, 740, 760, 780, 900, 1000, and 1040 of FIGS. 6A-7B and 9-10B, respectively.

In some embodiments, image-processing device 400 may be configured to scan, print, and/or copy an image using various image processing technologies. For example, image-processing device 400 may scan documents utilizing various scanning technologies, including, but not limited to, flatbed scanners (e.g., charge-coupled device (CCD), contact image sensor (CIS)), drum scanners, hand scanners, smartphone scanner apps, or the like. In other embodiments, image-processing device 400 may print an image utilizing various printing technologies, including, but not limited to, laser printers, LED printers (or other toner-based printing technologies), liquid inkjet printers, solid ink printers, dye-sublimation printers, inkless printers such as thermal printers and UV printers, dot-matrix printers, ink-based plotters, or the like. In some embodiments, image-processing device 400 may represent a multi-function printer (MFP). In various embodiments, image-processing device 400 may employ embodiments of both scanning and printing to perform scanning operations.

As shown, image-processing device 400 may include processor 402, one or more network interfaces 440, processor readable storage media 442, display 444, keyboard and/or keypad 446, pointing device 448, input/output interface 450, printing assembly 452, toner assembly 454, scanner assembly 456, and memory 404, all in communication with each other via bus 412.

Image-processing device 400 may communicate with a remote computer, such as mobile device 200 of FIG. 2 or network computer 300 of FIG. 3, the Internet, or some other communications network, via network interface(s) 440. Network interface 440 may enable various communication protocols including but not limited to TCP/IP, Wi-Fi, Bluetooth, or the like. Communications may also be over a universal serial port (USB); a parallel port; a serial bus such as RS-232 (Recommended Standard 232), ANSI/TIA/EIA-422, or the like; IEEE 1394 (e.g., Firewire); or the like. Network interface unit(s) 440 is sometimes known as a transceiver, transceiving device, or network interface card (NIC).

Display 444 may include virtually any type of display, monitor, terminal, screen and the like that displays text, graphics, images, and/or any other type of data to a user. Types of displays may include, but are not limited to, a liquid crystal display (LCD), gas plasma, light emitting diode (LED), cathode ray tube (CRT), or the like. Display 444 may also interface with keyboard/keypad 446 and/or pointing device 448 to receive and/or display user input. Additionally, or alternatively, image-processing device 400 may communicate with one or more display devices that are external to the image-processing device, to display information regarding print jobs, scan jobs, or the like.

Keyboard/keypad 446 may comprise any input device arranged to receive input from a user. For example, keyboard/keypad 446 may include a push button numeric dial, keyboard, touch screen, or the like. Keyboard/keypad 446 may include alphabetic inputs, numeric inputs, and/or other character inputs, and may further include function and/or command buttons associated with functionality for selecting, examining, editing, and/or printing documents. User inputs made via keyboard/keypad 446 may be shown in display 444.

Pointing device 448 may include virtually any device that enables a user to input spatial and/or positional data to image-processing device 400. Pointing device 448 may include devices based on the user touching a surface, such as a touchpad, touchscreen, graphics tablet, joystick or pointing stick, either with a body part (e.g. finger or hand) or with an object such as a wand, stylus, pen, lightpen and the like. Pointing device 448 may further include devices based on the user moving an object, such as a mouse, trackball, joystick, and the like. User inputs made via pointing device 448 may be shown in display 444.

Input/output interface 450 may include various means for communicating with external devices, such as external displays, user input devices, computer devices, networking devices, and the like. Input/output interface 450 may employ one or more communications technologies including but not limited to USB, Bluetooth, serial port (e.g. RS-232 standard), parallel port (e.g. IEEE 1284 standard), and the like. In some embodiments, a USB driver or other portable storage device may communicated with image-processing device 400 through input/output interface 450 and be utilized to provide a document to image-processing device 400.

Memory 404 may include RAM, ROM, and/or other types of memory. Memory 404 illustrates an example of computer-readable storage media (devices) for storage of information such as computer-readable instructions, data structures, program modules or other data. Memory 404 may store system firmware 408 for controlling low-level operation of image-processing device 400. The memory may also store operating system 406 for controlling the operation of image-processing device 400. It will be appreciated that this component may include a general-purpose operating system such as a version of UNIX, or LINUX™, or a specialized operating system designed and created to support the functionality of image-processing device 400. The operating system may include or interface with a virtual machine module such as the Java virtual machine or Microsoft.NET runtime that may enable control of hardware components and/or operating system functions via applications that run under such virtual machine modules.

Although illustrated separately, memory 404 may include processor readable storage media 442. Processor readable storage media 442 may be referred to and/or include computer readable media, computer readable storage media, and/or processor readable storage device. Processor readable storage media 442 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Memory 404 further includes one or more data storage 410, which can be utilized by image-processing device 400 to store, among other things, applications 420 and/or other data. For example, data storage 410 may also be employed to store information that describes various capabilities of image-processing device 400. The information may then be provided to another device based on any of a variety of events, including being sent as part of a header during a communication, sent upon request, or the like.

Data storage 410 may also store program code, instructions, and/or data. For example data storage 410 may be configured to store imaging commands, diagnostics, user preferences, imaging control software, information regarding the capabilities of the image-processing device such as supported color palettes, fonts, pagination, page size, and the like. Data storage 410 may further store images that are scanned (e.g., image data 490), documents to be printed (e.g., queuing multiple print jobs), or the like, as well as any other information needed for selecting, examining, editing, modifying, displaying, scanning, copying, and/or printing an image, document, or file. In various embodiments, data storage 410 may store image data 490. The stored image data 490 may be image data, screened image data, or any other such image data.

Applications 420 may include computer executable instructions, which may be loaded into mass memory and run on operating system 406. Applications 420 may include an application that is enabled to employ embodiments described herein. In various other embodiments, image-processing device 400 may include circuitry and/or hardware (e.g., an application-specific integrated circuit (ASIC) 464 or a Field Programmable Gate Array (FPGA) 462) to perform embodiments described herein. In yet other embodiments, combinations of software and hardware may also be employed. In some embodiments, applications 420 may include an image screening application 492 to screen image data and generate screened image data.

As stated herein, image-processing device 400 may incorporate various types of scanning and/or printing technologies without departing from the scope of the invention. In some embodiments, scanner assembly 456 that may be configured to employ various scanning technologies for scanning a document to create a digital image that includes a plurality of pixels. For example, in a CCD flatbed scanner, scanner assembly 456 may include a glass pane, under which a bright light can illuminate the pane, and a moving optical array. A CCD-type scanner may typically contain three rows of sensors with red, green, and blue filters. In another example, a CIS scanner, scanner assembly 456 may include a moving set of red, green, and blue LEDs strobed for illumination, and a connected monochromatic photodiode array under a rod lens array for light collection. Images to be scanned may be placed face down on the glass, an opaque cover may be lowered over the image to exclude ambient light, and the sensor array and light source move across the pane, reading the entire area. However, embodiments are not so limited, and other scanning technologies may also be employed.

In some embodiments, image-processing device 400 may be configured to employ laser printing technology. The following is an example, non-limiting description of laser printing technology that may be employed to implement embodiments of the invention. In such embodiments, printing assembly 452 may include such elements as are necessary for laser printing, such as a drum assembly, corona wire, fuser, discharge lamp, laser scanning unit, and/or photoreceptor. In some embodiments, drum assembly may be configured to revolve, and may be made of any of a variety of photoconductive materials. The drum assembly may be given an electric charge by the corona wire (or in some embodiments by a charged roller). As the drum assembly rotates, a laser scanning unit may direct a laser beam across the drum assembly's surface based on the data to be printed. A toner assembly 454 may provide toner, such as in a powder form, onto the drum assembly. A corona wire may further provide a charge to paper or other print material, which may then be moved over the drum assembly. The paper or other print material may then pass through a fuser such that the applied toner is heated or otherwise caused to adhere to the paper or other print material. Upon depositing toner to the paper or other print material, the surface of the drum of the drum assembly may pass a discharge lamp where a light, or the like, may expose the drum to erase or remove the electrical image. In one embodiment, the drum surface of the drum assembly may then pass the corona wire, which may then reapply a charge. It should be noted that embodiments of the invention are not limited to this method of transferring data onto a print material, and other mechanisms may also be used. Thus, the invention is not to be constrained or otherwise narrowed by this embodiment.

In various embodiments, printing assembly 452 and/or toner assembly 454 may communicate with a print engine driver to facilitate printing of documents and other files and/or images. A print engine driver may be responsible for numerous actions associated with the physical printing of the document, including, but not limited to, setting up the print engine to print a page, requesting paper to be fed through the printer, passing the application generated raster data (e.g., image representation) to the print engine, monitoring for completion of the print job, monitoring for errors, or the like. The print engine driver may select a paper size, media type, input tray, output bin, other finishing options or print engine parameters, or the like. In various embodiments, the print engine driver and/or the physical print engine may be capable of handling one or more pages in parallel.

In various embodiments, image-processing device 400 may include hardware components, software components, or a combination thereof, to employ embodiments described herein. For example, image-processing device 400 may include a scanning assembly 456 (or scanner input component) and one or more cameras 466. The scanning component 368 may be operative to scan a image to acquire image data. The camera 466 may be operative to capture image data.

GPS transceiver 458 can determine the physical coordinates of the systems, transmitters, receivers, network computer 300, and the like on the surface of the Earth, which typically outputs a location as latitude and longitude values. GPS transceiver 348 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of transmitters and receivers on the surface of the Earth. It is understood that under different conditions, GPS transceiver 458 can determine a physical location for image-processing device 400. In at least one embodiment, however, image-processing device 400 may, through other components, provide other information that may be employed to determine a physical location of the systems, including for example, a Media Access Control (MAC) address, IP address, and the like.

In addition to GPS transceiver 458, image-processing device 400 may include other sensors 460 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors 460 may be one or more hardware sensors that collect and/or measure data that is external to image-processing device 400.

The image processing device 400 may include an embedded logic hardware device instead of a CPU. The embedded logic hardware device would directly execute it's embedded logic to perform actions, e.g., an Application Specific Integrated Circuit (ASIC) 464, Field Programmable Gate Array (FPGA) 464, and the like.

Also, in one or more embodiments, the image-processing device 300 may include a hardware microcontroller instead of a CPU. In at least one embodiment, the microcontroller would directly execute its own embedded logic to perform actions and access it's own internal memory and it's own external Input and Output Interfaces (e.g., hardware pins and/or wireless transceivers) to perform actions, such as System On a Chip (SOC), and the like.

Example Image-Processing System

Figure 5:
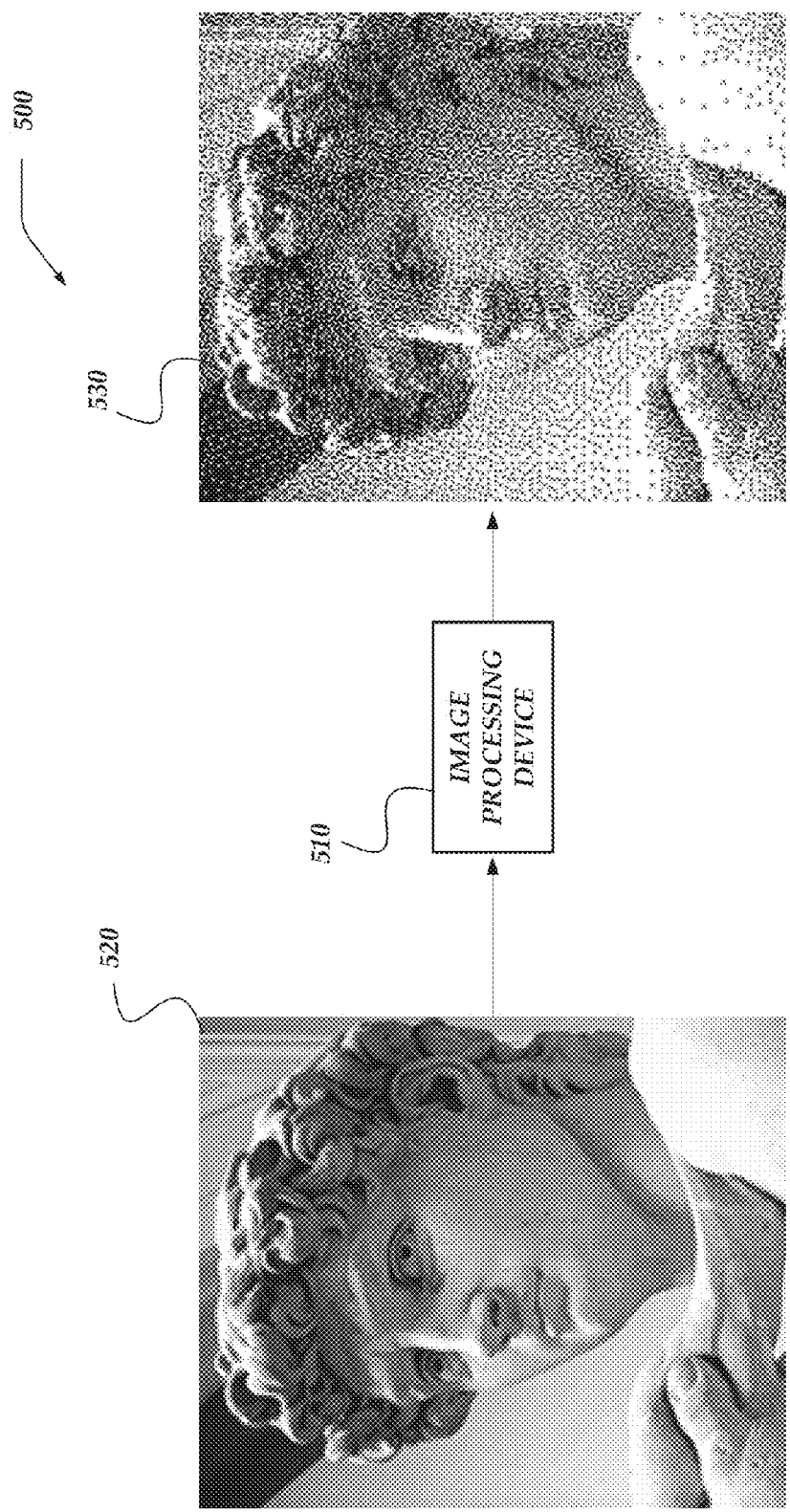
FIG. 5 shows a schematic diagram of an image-processing system that is operative to screen image data and is consistent with the various embodiments described herein.

FIG. 5 shows a schematic diagram of an image-processing system that is operative to screen image data and is consistent with the various embodiments described herein. System 500 includes an image-processing device 510, which may be similar to image-processing device 110 of FIG. 1 and/or image-processing device 400 of FIG. 4. In at least one embodiment, image-processing device 510 may be similar to mobile devices 103-105 of FIG. 1 or mobile device 200 of FIG. 2. Furthermore, image-processing device 510 may include similar features to network computer 102 of FIG. 1 or network computer 300 of FIG. 3. For instance, image-processing device 510 may be a server device, such as a web server.

In various embodiments, image-processing device 510 receives image data that represents image 520. In the exemplary embodiment shown in FIG. 5, image 520 is a continuous tone grayscale image. Other embodiments are not so constrained and the image may be a color image. Image-processing device 510 screens the image data to generate the screened image data representing screened image 530. Screened image 530 is a halftone grayscale image. In other embodiments, the screened image may be a color image.

Note that screened image 530 resembles image 520, but includes less detail. The screened image 530 includes less detail because the pixel depth of the screened image data is less than the pixel depth of the image data. Specifically, each of the image data and the screened image data include a luma channel. The channel depth of the luma channel of the image data may be 8 or 16 bits. In contrast, the channel depth of the luma channel of the screened image data is 2 bits, i.e. each pixel is either 0, 1, 2, or 3.

Certain screens may generate screened image data that better represent, render, or reproduce certain features in the image. For instance, for some point conversion screens, such as clustered or dispersed dot screens, the generated screened image data adequately represent (in the screened image) the smoothly textured regions of the image. Such screens also generate screened image data that adequately represent (in the screened image) larger regions of the image that include solid or relatively constant (or slowly changing) colors. Such screens generate screened image data that adequately render continuous regions of the image in the screened image.

Furthermore, such clustered dot screens, such as halftone screens, are advantageous for various printing devices, because the dots in the screened image tend to be clustered together. For instance, to maintain good color levels in laser printers, it may be advantageous to clump the printing pixels into clusters, rather than being isolated. Clustered dot screens adequately accomplish such clustering and clumping of the printing dots.

However, clustered or dispersed dot screens may not generate screened image data that adequately represents (in the screened image) discontinuous features in the image. Such discontinuous features include edges, ridges, quickly changing colors, quickly changing luminance (contrast) in the image, and the like. Such discontinuous features may be rendered fuzzy or jagged in the screened image when a point conversion screen, such as a halftone screen, is used to generate the screened image data. For instance, edge features in the image may lose sharpness and detail when rendered in the screened image, where the screened image data was generated with a halftone screen. However, other screens, such as error diffusion screens may generate screened image data that better renders discontinuous features in the screened image.

Accordingly, in various embodiments, in a screening process, separate screens are selectively associated with and applied to separate regions of the image data, based on whether a particular image data region is a discontinuous region or a continuous region. For discontinuous regions of the image data, a screen that is suited to better generate screened image data is employed to generate the screened image data for the corresponding pixels that map to these discontinuous features in the screened image. For instance, an error diffusion or threshold screen may be applied to the regions of the image data that include one or more discontinuous features. In contrast, continuous regions of the image data that represent smooth features and/or constant (or slowly changing) colors or luminance, other screens, such as a halftone screen is employed to generate the screened image data for pixels representing the corresponding continuous regions in the screened image.

Essentially, in a screening process, a discontinuous feature detector, such as an edge detector or a ridge detector, is used to discriminate between two or more screens to apply in separate regions of the image data. Such separate regions may include discontinuous regions and continuous regions. In various embodiments, a discontinuous feature detector is applied to at least a region of the pixels of the image data. The discontinuous feature detector locates discontinuous features, such as edges, ridges, and the like, in the image data. For pixels included in the continuous regions of the image data, a screen such as a halftone screen is employed to generate the corresponding screened pixels. For pixels that are located on or near a discontinuous feature, the screen is altered, varied, modified, or updated to switch to a screen that is better suited for such discontinuous features, such as an error diffusion screen or a threshold screen.

Employing separate, or blended, screens in separate discontinuous/continuous regions of the image data results in a higher contrast, more sharply defined, and a better-looking screened image. For instance, edges in the screened image are rendered sharper and less fuzzy. Because an error diffusion screen (or other screen) is employed near discontinuous features in the image data, such as edges, pixels on the dark side of an edge are turned on. The pixels on the light side of the edge are turned off. However, because a halftone screen is employed in smoothly textured regions of the image data, the pixels will still be clustered, resulting in screened image data appropriate for many printing devices.

Accordingly, in the various embodiments, during a screening of the image data, a first screen is applied to at least a region of the image data pixels that are included in the discontinuous regions of the image data. The first screen that is applied to the discontinuous pixels may include at least one of an error diffusion screen or a threshold screen. Thus, a discontinuous screen may be a screen applied to a region of the discontinuous pixels during a screen of the image data. A discontinuous screen may include an error diffusion screen or a threshold screen.

A second screen is applied to at least a region of the image data pixels that are included in the continuous regions of the image data. The second screen applied to these continuous pixels of the image data may include a point conversion screen. A point conversion screen may include an ordered dithering screen, such as a clustered dot screen, including a halftone screen. Thus, a continuous screen may be a screen applied to a region of the continuous pixels during a screen of the image data. A continuous screen may include a halftone screen.

In various embodiments, the discontinuous features are detected by applying a discontinuous feature detector to a single channel of the image data, such as the luma channel. Once the discontinuous features are located in the luma channel, each of the channels of the image data are screened, based on the located discontinuous features in the luma channel. For instance, image data that is represented in the RGB color space may be received. The RGB representation may be converted to a YUV representation. A discontinuous feature detector, such as an edge detector is applied to the Y channel. A CMYK representation of the image data may also be generated.

In such an exemplary embodiment, at least two separate cyan channel screens may be determined, e.g. a cyan continuous screen and a cyan discontinuous screen. Likewise, two separate magenta channel screens are determined (magenta continuous screen and magenta discontinuous screen), two separate yellow channel screens are determined (yellow continuous screen and yellow discontinuous screen), and two separate key channel screens are determined (key continuous screen and key discontinuous screen).

When screening the cyan channel of the image data, the discontinuous features located in the luma channel are used to determine whether individual pixels are included in or near a discontinuous feature of the cyan channel. The discontinuous screen is employed to determine the screened pixel values of the pixels within the discontinuous regions and the continuous screen is employed to determine the screened pixel values of the pixels within the continuous regions. Likewise, the discontinuous features of the luma channel are used to discriminate between the employment of the discontinuous/continuous screens in magenta channel, the two discontinuous/continuous screens in the yellow channel, and the discontinuous/continuous screens in the key channel.

The two or more screens in a particular channel may be rotated relative to the two or more screens in the other channels, such that the screens for each channel are rotated relative to the screens for each of the other channels. For instance, the two or more screens in the magenta channel may be rotated relative to the two or more screens in the cyan channel. Such relative rotation of the channel screens may help to reduce the appearance of moiré patterns in the generated screened image.

In other embodiments, discontinuous feature detectors are separately applied to each channel. For instance, a discontinuous feature detector may be applied to the cyan channel. Likewise, the discontinuous feature detector may be applied separately to each of the other channels. The discontinuous features located in the cyan channel are used to discriminate between the employment of the discontinuous and continuous cyan channel screens in the cyan channel. Likewise, the discontinuous features located in the magenta channel are used to discriminate between the employment of the discontinuous and continuous magenta channel screens in the magenta channel.

The discontinuous feature detector applied to each channel may be the same discontinuous feature detector, or a separate discontinuous feature detector may be applied to each channel of the image data. For instance, the discontinuous feature detector applied to the cyan channel may be tailored to detect discontinuous features in the cyan channel. A separate discontinuous feature detector may be applied to the magenta channel, where the separate discontinuous feature detector is tailored to detect discontinuous features in the magenta channel. Other discontinuous feature detectors may be applied to the other channels, where the other discontinuous feature detectors have been specifically tailored to detect discontinuous features in the other channels.

In at least one embodiment, two separate sets of screen parameters are blended before the screened pixel is computed. For instance, the screen parameters may include a screen matrix or kernel. The combination of the sets of screen parameters may be based on a screening weight. The screening weight for a particular pixel may be based on the gradient magnitude for that pixel. Accordingly, the transition between the continuous screened regions of the image data and the discontinuous screened regions of the image are smoothed via the screening weight.

General Operation

Operation of certain aspects of the invention will now be described with respect to FIGS. 6A-9B. In at least one of various embodiments, at least a portion of processes 600, 640, 700, 740, 760, 780, 900, 1000, and 1040 of FIGS. 6A-7B and 9-10B, respectively, may be implemented by and/or executed on an image-processing device, such as image-processing device 400 of FIG. 4, and/or one or more network computers or mobile devices, such as network computer 200 of FIG. 2 and mobile device 300 of FIG. 3, respectively. Additionally, various embodiments described herein can be implemented in a system such as system 100 of FIG. 1 or system 500 of FIG. 5.

Figure 6A:
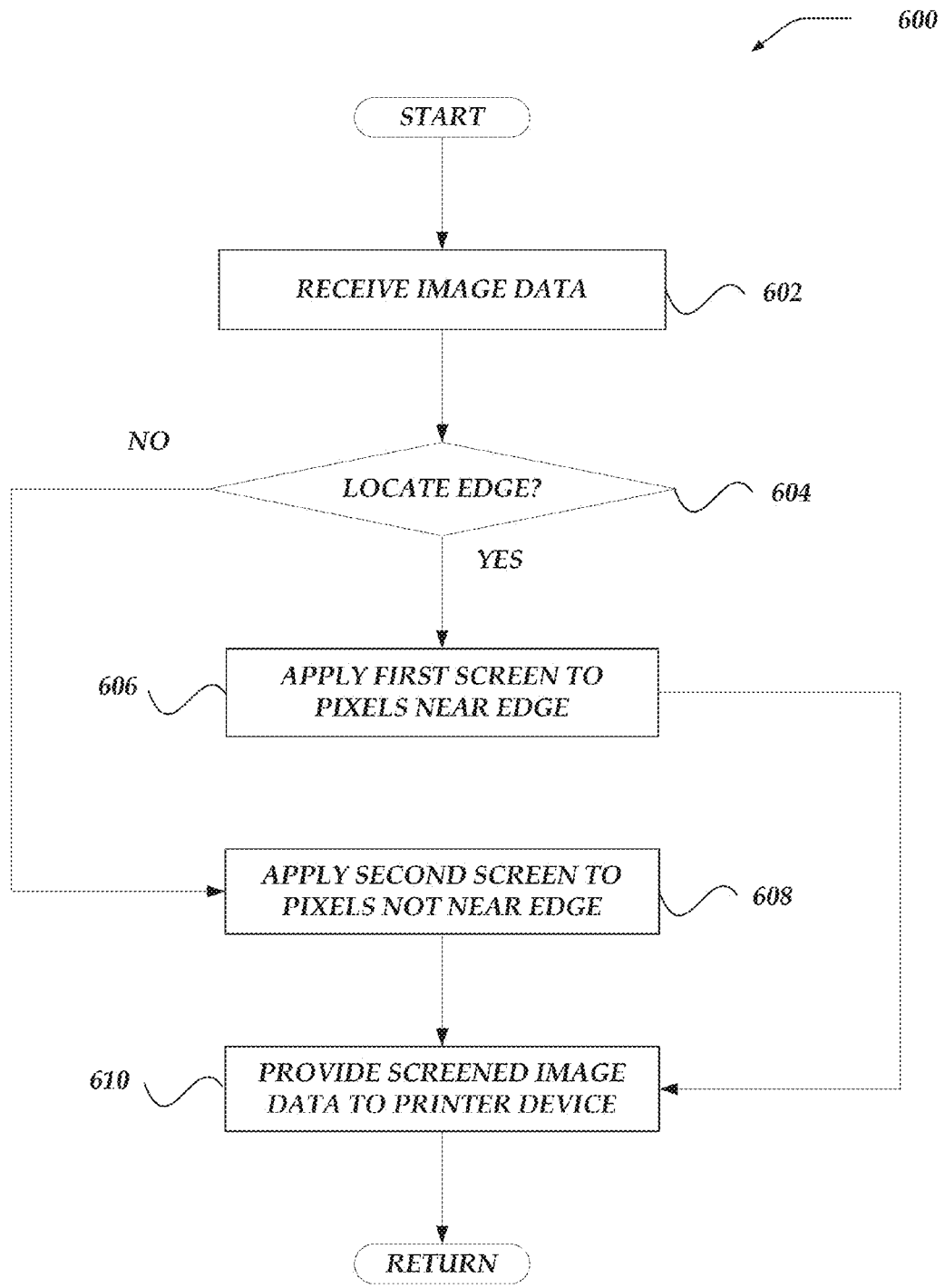
FIG. 6A illustrates a logical flow diagram generally showing one embodiment of an overview process for processing image data for printing by a printing device that is consistent with the various embodiments disclosed herein.

FIG. 6A illustrates a logical flow diagram generally showing one embodiment of an overview process for processing image data for printing by a printing device that is consistent with the various embodiments disclosed herein. Process 600 may begin, after a start block, at block 602, where image data is received. The image data may be received by way of scanning an image with an image device, capturing an image with one or more cameras, receiving the image data over a network, or the like. In at least one embodiment, the image data is scanned in discreet chunks or regions of the image. For instance, a scanner assembly of an image-processing device may scan an image in multiple chunks, where each chunk includes a contiguous subset of image data representing a contiguous region of the image.

At decision block 604, it is determined whether one or more edges are located in the received image data. If one or more edges are located in the image data, process 600 flows to block 606. Otherwise, process 600 flows to block 608. In some embodiments, an edge detector is employed to determined when one or more edges are located in the regions of the image data.

Figure 7A:
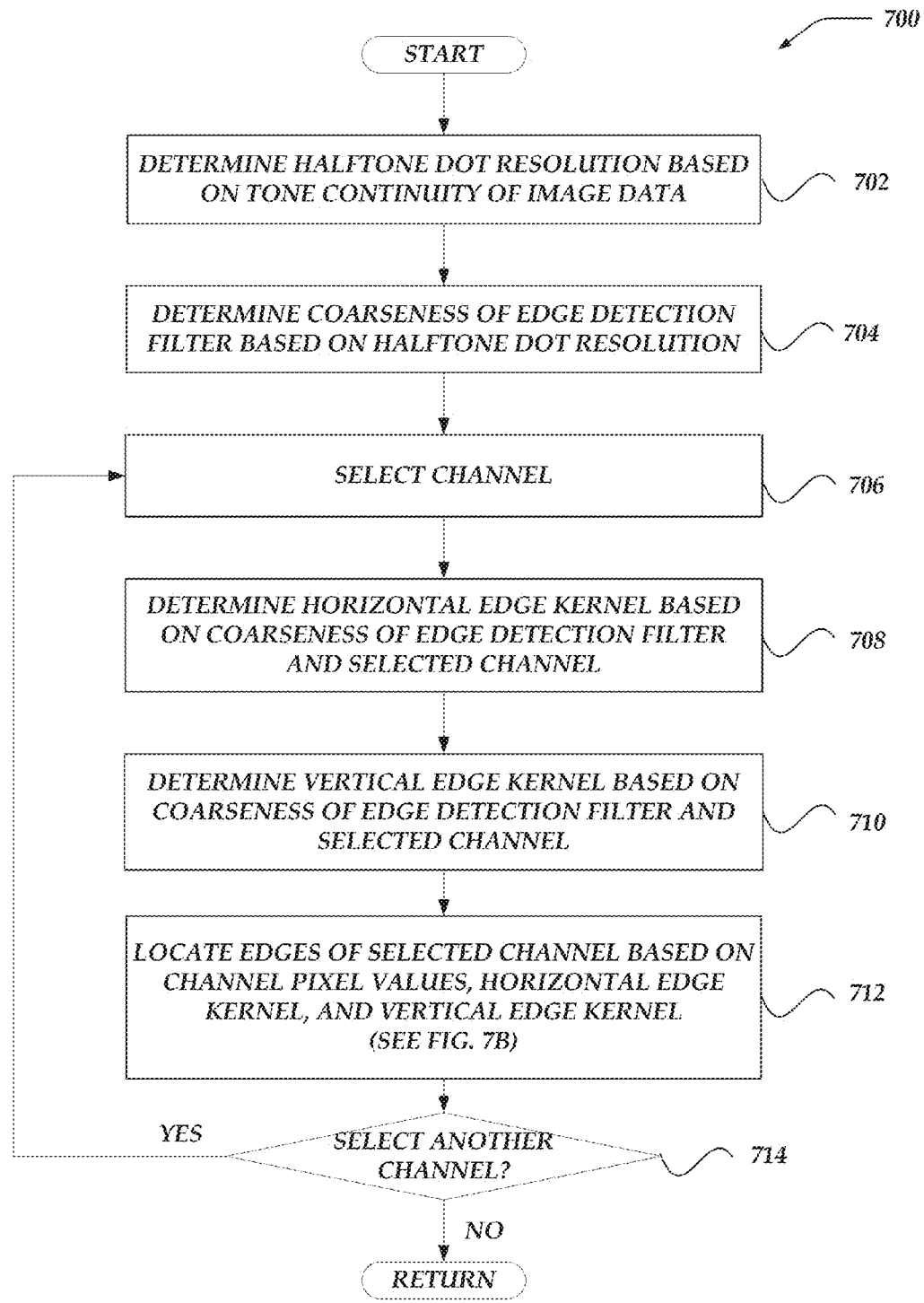
FIG. 7A illustrates a logical flow diagram generally showing a process for locating edges in a selected channel of the image data that is consistent with the various embodiments disclosed herein.
Figure 7B:
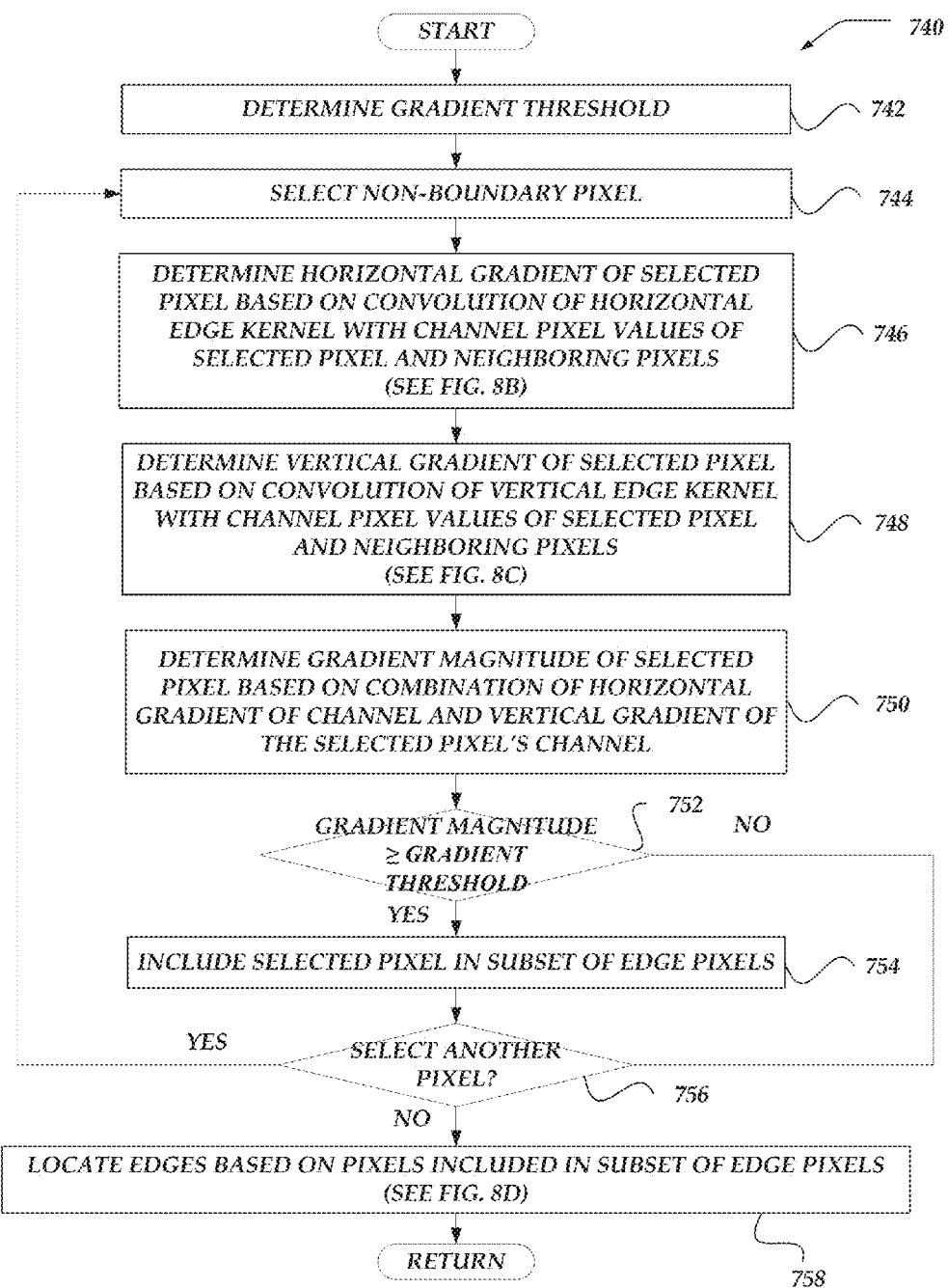
FIG. 7B illustrates a logical flow diagram generally showing an embodiment of a process for locating edges in a channel based on channel pixel values, a horizontal edge kernel, and a vertical edge kernel that is consistent with the various embodiments discussed herein.

Various embodiments of locating edges are discussed throughout, including at least in the context of processes 700 and 740 of FIGS. 7A and 7B respectively. However briefly, at block 604 an edge detector is employed to at least a region of the pixels included the image data. The edge detector may include gradient operator, or another differential operator, to determine large changes in neighboring pixels. In at least one embodiment, the edge detector may include a higher order differential operator. In at least one embodiment, another machine vision operator, such as a ridge detector, a valley detector or the like is employed to locate other features in the image data.

For each pixel, when the comparison between the pixel gradient and the g threshold is an affirmative comparison, a first screen is selected for the pixel. Otherwise, when the comparison is a negative comparison, a second screen is selected for the pixel. In various embodiments, an affirmative comparison may be when the pixel gradient is greater than or equal to the first screen threshold. A negative comparison on may be when the pixel gradient is less than the first screen threshold. Accordingly, the first screen threshold may be a pixel gradient threshold.

At block 606, the first screen is applied to the pixels having an affirmative comparison. Essentially, the first screen is applied to pixels that are included in, or located near one of the edges or other discontinuous features located in the image data. Various embodiments of determining if a pixel is located near an edge are discussed throughout. Thus, for pixels that have an affirmative comparison, one or more screened pixel values are determined based on one or more pixel values included the pixel and the first screen.

In various embodiments, the first screen includes an error diffusion screen, or some other screen, such as a threshold screen, that tends to sharply reproduce edges in screened image data. In the application of the first screen to pixels included in, or located near, one of the detected edges, one or more screened pixel values are determined. The screened pixel values are based on the applied first screen and the pixels values of the pixels that are located in, or near, the detected edges. Screened image data for a screened pixel that corresponds to the image data pixel is generated based on the applied first screen and the pixel values of the corresponding pixel.

At block 608, the second screen is applied to the pixels having a negative comparison. Essentially, the second screen is applied to pixels that are not near one of the edges or other discontinuous features located in the image data. Thus, for pixels that have a negative comparison, one or more screened pixel values are determined based on one or more pixel values included the pixel and the second screen. In various embodiments, the second screen includes a halftone screen, or some other screen that tends to cluster dots in the generated screened image data and render solid, smooth, or slowly changing regions of the image in adequate detail.

As with the first screen, in applying the second screen, screened pixel values are determined based on the applied second screen and the pixels values of the pixels that are not located near an edge. Screened image data for a screened pixel that corresponds to the image data pixel, is generated based on the applied second screen and the pixel values of the corresponding pixel.

When the one or more edges are undetected in the regions of the image data, the screened pixel values are determined based on the one or more pixel values included in each pixel in the regions of the image data and the second selected screen. Whether the edges are detected or undetected, screened image data may be generated. The screened image data based on the one or more screened pixel values.

At block 610, screened image data is provided to a printing device. When provided to the printing device, the screened image data may be employed to print a screened image at the printing device. Process 600 may terminate and/or return to a calling process to perform other actions.

Figure 6B:
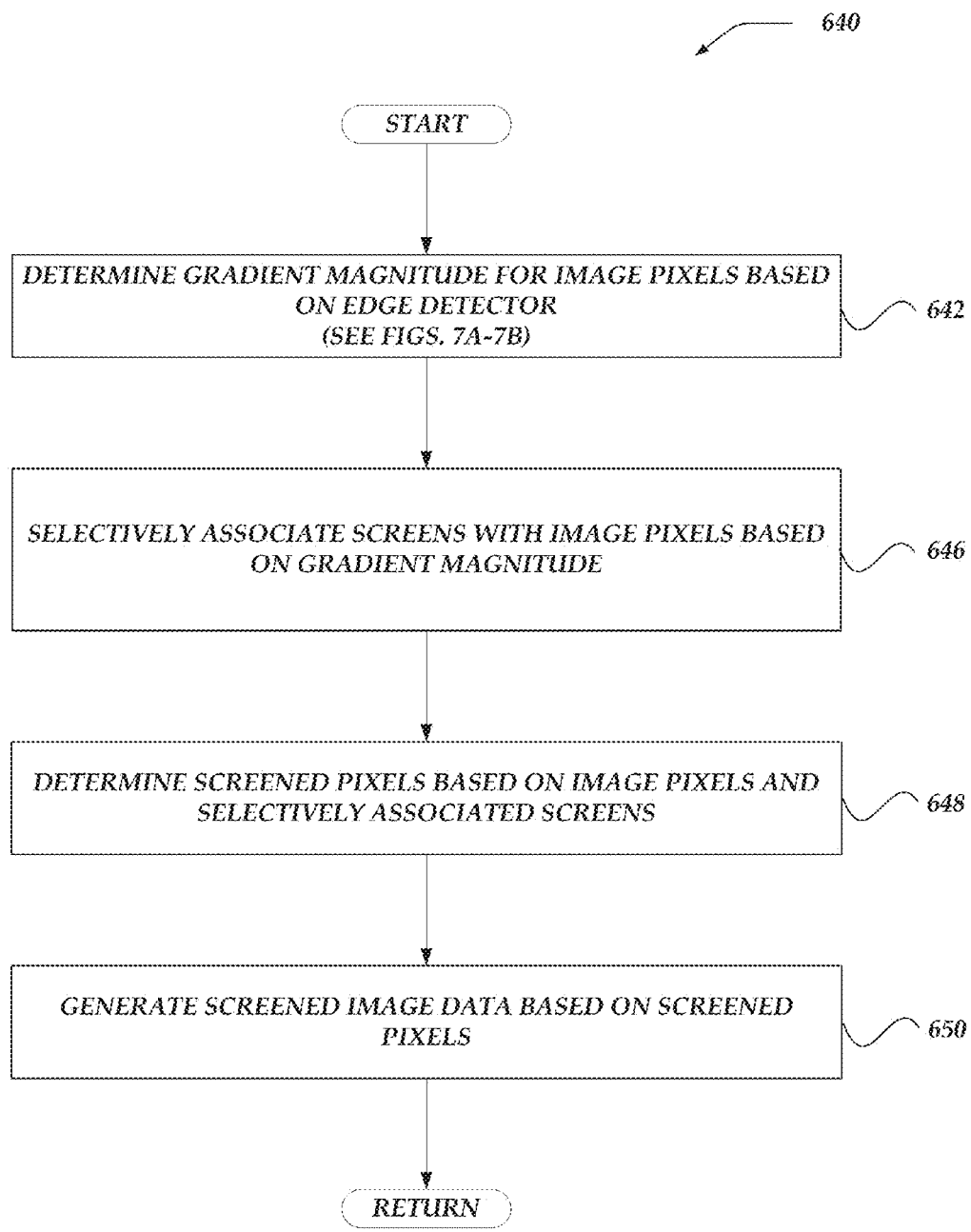
FIG. 6B illustrates a logical flow diagram generally showing another embodiment of an overview process for screening image data that is consistent with the various embodiments disclosed herein.

FIG. 6B illustrates a logical flow diagram generally showing another embodiment of an overview process for screening image data that is consistent with the various embodiments disclosed herein. Process 640 may begin, after a start block, at block 642, where a gradient magnitude is determined for image pixels is determined. The gradient magnitude for the image pixels may be determined based on one or more edge detectors or other discontinuous feature detectors. In various embodiments, an image-processing device, or another device, such as but not limited to a server device or a mobile device may receive and/or capture the image data. Various embodiments of receiving and/or capturing image data are discussed in at least the context of block 902 of process 900 of FIG. 9.

In various embodiments, discontinuous features, such as but not limited to edges, ridges, valleys, quickly changing colors or luminance, or other sharply defined or sharply contrasting features in the image data may result in relatively large gradient magnitudes. The gradient magnitudes may be in one or more channels of the color space that the image data is represented in. Various embodiments for determining gradient magnitudes for image pixels are described in the context of processes 700 and 740 of FIGS. 7A-7B. It should be noted that although edge location is discussed throughout, other discontinuous features, such as ridges may be similarly located via similar discontinuous feature detection operators, kernels, matrices, and the like.

Briefly, at block 642, one or more gradient magnitudes for at least a portion of the image pixels are determined based on one or more edge detectors or other discontinuous feature detectors. Discontinuous regions of the image data, where the discontinuous regions include one or more discontinuous features, may be located at block 642. In the located discontinuous regions, at least some of the pixel values in one or more channels have sharp changes, gradients, differentials, and the like. Regions of image data that include a large gradient in pixel values for at least one channel include discontinuous features, such as boundaries of features represented by the image data, including edges, ridges, valleys, and the like.

Locating discontinuous features in a channel may include locating or at least characterizing one or more sets of contiguous pixels in the image data. Such a set of contiguous pixels forms one or more curves in the two-dimension array of pixels. The curves indicate the boundaries of objects, the boundaries of surface markings, as well as curves that correspond to discontinuities in surface orientation within the image, e.g. discontinuous features. Accordingly, locating discontinuous features at block 642 may include generating such curves that include contiguous subsets of pixels that lie on or near the boundaries of discontinuous features, such as objects, surface markings, and other discontinuities in the image.

Figure 8B:
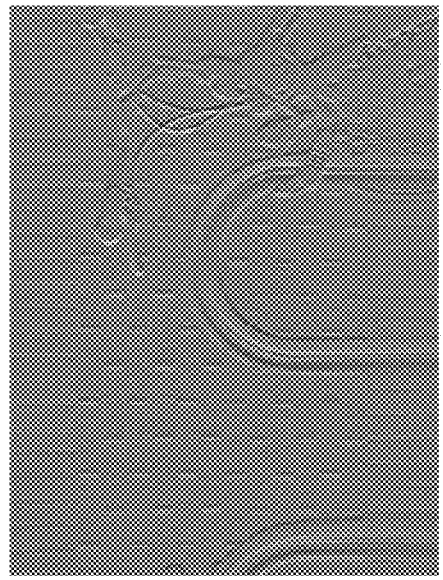
FIG. 8B illustrates the horizontal gradient of the luma channel of the grayscale continuous tone image of FIG. 8A.
Figure 8D:
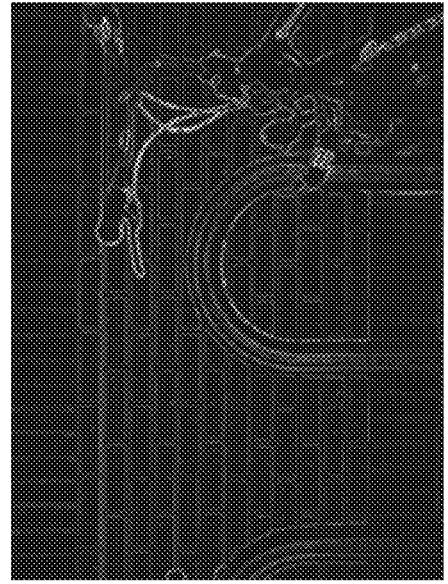
FIG. 8D illustrates the located edges in the luma channel of the grayscale continuous tone image of FIG. 8A.
Figure 8A:
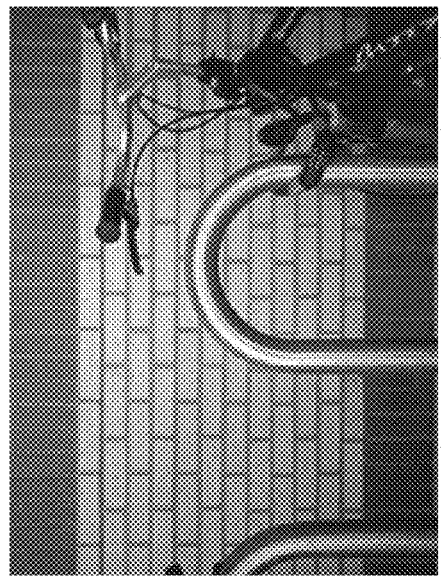
FIG. 8A shows a image that is represented by image data, where the image is a grayscale continuous tone image that includes a luma channel.

In the context of locating edges, FIG. 8A shows a image. The image of FIG. 8A is a continuous tone grayscale image, and includes a single luma channel. FIG. 8D illustrates the located edges in the luma channel of the image of FIG. 8A. Specifically, FIG. 8D shows the generated curves indicating an edge in the luma channel of the image data representing the image of FIG. 8A. In FIG. 8D, the contiguous pixels that are included in a located curve in the luma channel are colored white, while pixels that are not within a located curve are shaded black. As discussed throughout, discontinuous features, such as edges, may be detected in other channels of the color space. For instance, edges in each of the chrominance channels of colored image data may be located.

Any method for locating discontinuous features in image data may be employed at block 642. Locating a discontinuous feature may include detecting a discontinuous feature in the image data, as well as determining the location of the discontinuous feature. Determining the location of the discontinuous feature may include determining the position of the pixels that correspond to the discontinuous feature in the two-dimensional array of pixels in the image data.

In the context of locating edges, any search-based method or any zero-crossing based edge detection method may be employed. Various edge detection filters may be applied to the selected channel of the image data. Such edge detection filters may be gradient operators, or higher order differential operators, to detect edge regions in the image data. Such edge detection filters and/or operators include, but are not limited to Canny operators, Deriche operator, a differential edge detection operator, Sobel operator, Prewitt operator, Roberts cross operator, Kirsch operator, phase congruency, and the like.

In at least one embodiment, the image data may be filtered or pre-processed prior to applying a discontinuous feature detector, such as an edge detector to the image data. Such pre-processing may reduce the noise in the image data. For instance, the image data may be smoothed prior to locating discontinuous features. Such smoothing, other pre-processing, and/or filtering may enhance the accuracy of locating the discontinuous features at block 642.

At block 646, a plurality of screens are selectively associated with the image pixels based on the pixels' gradient magnitudes. Various embodiments of selectively associating screens with the pixels are discussed throughout. However, briefly, at block 646, separate screens are associated with separate pixels, or contiguous regions of pixels, based on the pixel gradient magnitude.

In at least one embodiment, the selective associating of the separate screens with the separate pixels is based on a gradient threshold. The gradient threshold may be predetermined or dynamically determined. In some embodiments, a user employs a preview mode to visually inspect the generated screened image data's sensitivity to the choice of the gradient threshold.

In various embodiments, a first screen, such as an error diffusion screen or a threshold screen, is associated with pixels that are included in, or close enough (as based on a choice of the gradient threshold) to at least one of the located discontinuous features. A second screen, such as a halftone screen is associated with pixels that are not included in a discontinuous feature and/or are associated with a sufficient gradient magnitude (as based on the choice of the gradient threshold).

At block 648, screened pixels are determined based on the pixels and the selectively associated screens. In some embodiments, the screened pixel values are determined by applying the selectively associated screens to each of the pixels included in the image data.

In some embodiments, screened pixel values included in a screened pixel that corresponds to a particular pixel are determined based on the pixel values included in the particular pixel and the screen that is selectively associated with the particular image. In at least the case where the associated screen includes an error diffusing screen, the screened pixel values are further based on at least a portion of the pixel values included in pixels neighboring the particular pixel. Screened pixel values may be determined for each channel of the color space of the image data. Determining screened pixel values based on a particular screen are further discussed in at least the context of processes 900, 1000, and 1040 of FIGS. 9-10B.

At block 650, the screened image data is generated based on the determined screened pixel values. In various embodiments, the screened pixel values are of a reduced pixel depth compared to the pixel values. The screened image data includes the screened pixel values. The screened pixel values may be arranged in an M×N two-dimensional array of screened pixels. Within each screened pixel, the screened pixel values may be further arranged in one or more screened channel pixel values. Because discontinuous and continuous screens where selectively associated and applied to the pixels, based on a proximity to a discontinuous feature, the screened image data better represents and renders the image. Process 640 may terminate and/or return to a calling process to perform other actions.

FIG. 7A illustrates a logical flow diagram generally showing a process for locating edges in a selected channel of the image data. Process 700 may begin, after a start block, at block 702, where a halftone dot resolution of the image data is determined. In various embodiments, the determination of the halftone dot resolution may be based on a tone continuity of the image data.

For instance, the image data may already be a scan of a previously halftone screened document. A halftone detector may be used to determine the resolution of the original halftone. If the image data was previously halftone screened (pre-screened), the halftone dot resolution will be determined. If the image data is not pre-screened image data, the halftone dot resolution will not be determined. At block 704, a coarseness of an edge detection filter is determined based on the halftone dot resolution. For instance, if the image data has already been pre-screened, a coarser edge detection filter may be required because the data is already somewhat coarse due to the pre-screening. Similarly, if the image data is relatively continuous in tone, then a finer edge detection filter is required.

In various embodiments, an edge detection filter may include one or more kernels or operators that are represented by square matrices (an N×N matrix). An edge detection filter may include a horizontal edge kernel and a vertical edge kernel. For instance, a coarser edge detection kernel or operator may include a 5×5 matrix, while a finer edge detection kernel may include a 3×3 matrix. In various embodiments, N is determined at block 704. In various embodiments, N is an odd positive integer, so that the matrix may be centered on a pixel to calculate a gradient of the pixel, based on the surrounding or neighboring pixels.

At block 708, a horizontal edge kernel is determined. The horizontal edge kernel may be based on the coarseness of the edge detection filter and the selected channel. In some embodiments, a 3×3 Sobel operator may be used as a horizontal edge kernel. For instance, the 3×3 horizontal operator ($G_x$) may be:

$$G_x = \begin{bmatrix} -1 & 0 & +1 \\ -2 & 0 & +2 \\ -1 & 0 & +1 \end{bmatrix}$$

A coarser edge detection may include a similar 5×5 or 7×7 matrix. In various embodiments, if the matrix is an N×N matrix, the size of the matrix is N. For instance, an alternative horizontal operator may include:

$$G_x = \begin{bmatrix} -1 & 0 & 0 & 0 & 1 \\ -1 & 0 & 0 & 0 & 1 \\ -1 & 0 & 0 & 0 & 1 \\ -1 & 0 & 0 & 0 & 1 \\ -1 & 0 & 0 & 0 & 1 \end{bmatrix}$$

At block 710, a vertical edge kernel is determined. Similar to the horizontal edge kernel, the vertical edge kernel may be based on the coarseness of the edge detection filter and the selected channel. For instance, the 3×3 vertical operator ($G_y$) may be:

$$G_y = \begin{bmatrix} -1 & -2 & -1 \\ 0 & 0 & 0 \\ +1 & +2 & +1 \end{bmatrix}$$

A coarser edge detection may include a similar 5×5 or 7×7 matrix. In various embodiments, the $G_y$ matches $G_x$. However, not all embodiments are so constrained. For instance, an alternative horizontal operator may include:

$$G_x = \begin{bmatrix} -1 & -1 & -1 & -1 & -1 \\ 0 & 0 & 0 & 0 & 0 \\ 0 & 0 & 0 & 0 & 0 \\ 0 & 0 & 0 & 0 & 0 \\ 1 & 1 & 1 & 1 & 1 \end{bmatrix}$$

At block 712, edges of the channel are located. Various embodiments for locating edges of the selected channel are discussed in the context of process 740 of FIG. 7B. However, briefly the edges are located based on the channel pixel values, the horizontal edge kernel, and the vertical edge kernel. In various embodiments, each of $G_x$ and $G_y$ are applied to each pixel to determine a gradient associated with the pixel. Edges are indicated by regions with pixels of a relatively large gradient magnitude.

It should be noted that although Sobel operators are discussed above, any edge operator or other discontinuous feature operator may be used as the horizontal and vertical edge kernels. For instance, Canny operators, Deriche operators, a differential edge detection operator, Prewitt operators, Roberts cross operators, Kirsch operator, phase congruency, and the like may be employed in any of the processes disclosed herein.

At decision block 714, it is determined if another channel is to be selected. If another channel is not to be selected, process 700 may terminate and/or return to a calling process to perform other actions. Otherwise, process 700 returns to block 706 to select another channel to locate edges in.

FIG. 7B illustrates a logical flow diagram generally showing an embodiment of a process for locating edges of a channel based on channel pixel values, a horizontal edge kernel, and a vertical edge kernel that is consistent with the various embodiments discussed herein. Process 740 may begin, after a start block, where a gradient threshold is determined. In some embodiments, the gradient threshold may be predetermined or dynamically determined. In some embodiments, the gradient threshold may be determined via a lookup table. In other embodiments, the gradient threshold may be provided by a user.

In some embodiments, the gradient threshold may be based on a selected channel, for instance the channel selected at block 706 of process 700. In at least one embodiment, a user may employ a preview mode to determined a sensitivity of the screened image to the choice of the gradient threshold. Such a preview mode provides visual feedback to the user. The user may determine the gradient threshold based on the preview mode.

At block 744, a non-boundary pixel is selected. Here, the boundary refers to the boundaries of the M×N pixel array. If a 3×3 matrix is used for the edge kernels, then a pixel at least one pixel unit away from each of the boundaries of the image data must be selected. If a 5×5 matrix is used, then a pixel at least two pixel units away from each of the boundaries must be selected.

At block 746, the horizontal gradient of the selected pixel (selected at block 742 of process 740) and selected channel (selected at block 706 of process 700) is determined. In various embodiments, the horizontal gradient is determined based on the convolution of the horizontal edge kernel with the channel pixel values of the selected pixel and the neighboring pixels. In various embodiments, $G_x$ is centered on the selected pixel. A convolution is performed between $G_x$ and each of the pixels that $G_x$ is tiled over. The resulting scaler (horizontal gradient) may be represented as $g_x$.

FIG. 8B illustrates the horizontal gradient of the luma channel of the grayscale continuous tone image of FIG. 8A. Note that FIG. 8B highlights the vertical edges of FIG. 8A, because a large gradient in the horizontal direction is an indicator of a substantively vertical edge.

At block 748, the vertical gradient of the selected pixel and selected channel is determined. In various embodiments, the vertical gradient is determined based on the convolution of the vertical edge kernel with the channel pixel values of the selected pixel and the neighboring pixels. In various embodiments, $G_y$ is centered on the selected pixel. A convolution is performed between $G_y$ and each of the pixels that $G_y$ is tiled over. The resulting scaler (vertical gradient) may be represented as $g_y$.

Figure 8C:
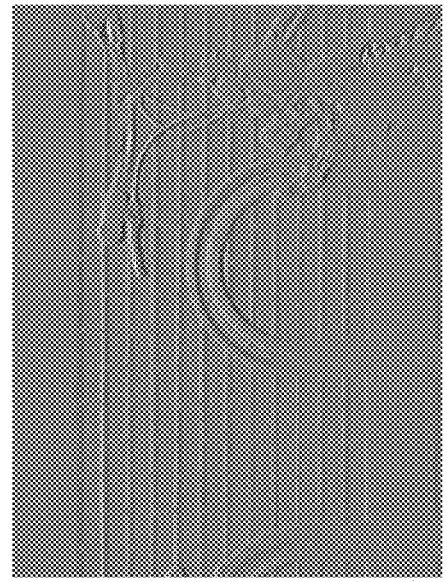
FIG. 8C illustrates the vertical gradient of the luma channel of the grayscale continuous tone image of FIG. 8A.

FIG. 8C illustrates the vertical gradient of the luma channel of the grayscale continuous tone image of FIG. 8A. Note that FIG. 8C highlights the horizontal edges of FIG. 8A, because a large gradient in the vertical direction is an indicator of a substantively horizontal edge.

At block 750, a gradient magnitude of the selected pixel and selected channel is determined. The gradient magnitude may be based on a combination of the horizontal gradient and the vertical gradient of the selected pixel's channel. In at least embodiment, the combination may be an addition in quadrature. For instance, the gradient magnitude, represented as |g| may be determined as $$|g| = \sqrt{g_x^2 + g_y^2}$$

At decision block 752, it is determined in the gradient magnitude (g) for the selected pixel and selected channel is greater than or equal to the gradient threshold. If the gradient magnitude is greater than or equal to the gradient threshold, then process 740 flows to block 754. Otherwise, process 740 flows to decision block 756.

At block 754, the selected pixel is included in a subset of edge pixels. At decision block 756, it is determined whether other pixels are to be analyzed. If so, process 740 returns to block 744 to select another non-boundary pixel. If each of the pixels of interest has already been analyzed, process 740 proceeds to block 758.

At block 758, the edges of the channel are located. In various embodiments, the locating the edges is based the pixels included in the subset of edge pixels. In some embodiments, an edge may be located by determining the indexes of the contiguous regions or contiguous regions of the pixels included in the subset of edge. Edge curves may be determined based on the located contiguous regions. The curves may be parameterized.

In some embodiments, each pixel included in an edge feature must be contiguous with at least one other pixel included in the edge. In at least one embodiment, each located edge must include at least a predetermined or dynamically determined minimum number of pixels so that point or small defects in the image data are not labeled as located edges. FIG. 8D illustrates the located edges in the luma channel of the image of FIG. 8A. Process 740 may terminate and/or return to a calling process to perform other actions.

FIG. 8A shows a image that is represented by image data, where the image is a grayscale continuous tone image that includes a luma channel. FIG. 8B illustrates the horizontal gradient of the luma channel of the grayscale continuous tone image of FIG. 8A. FIG. 8C illustrates the vertical gradient of the luma channel of the grayscale continuous tone image of FIG. 8A. FIG. 8D illustrates the located edges in the luma channel of the grayscale continuous tone image of FIG. 8A.

Figure 9:
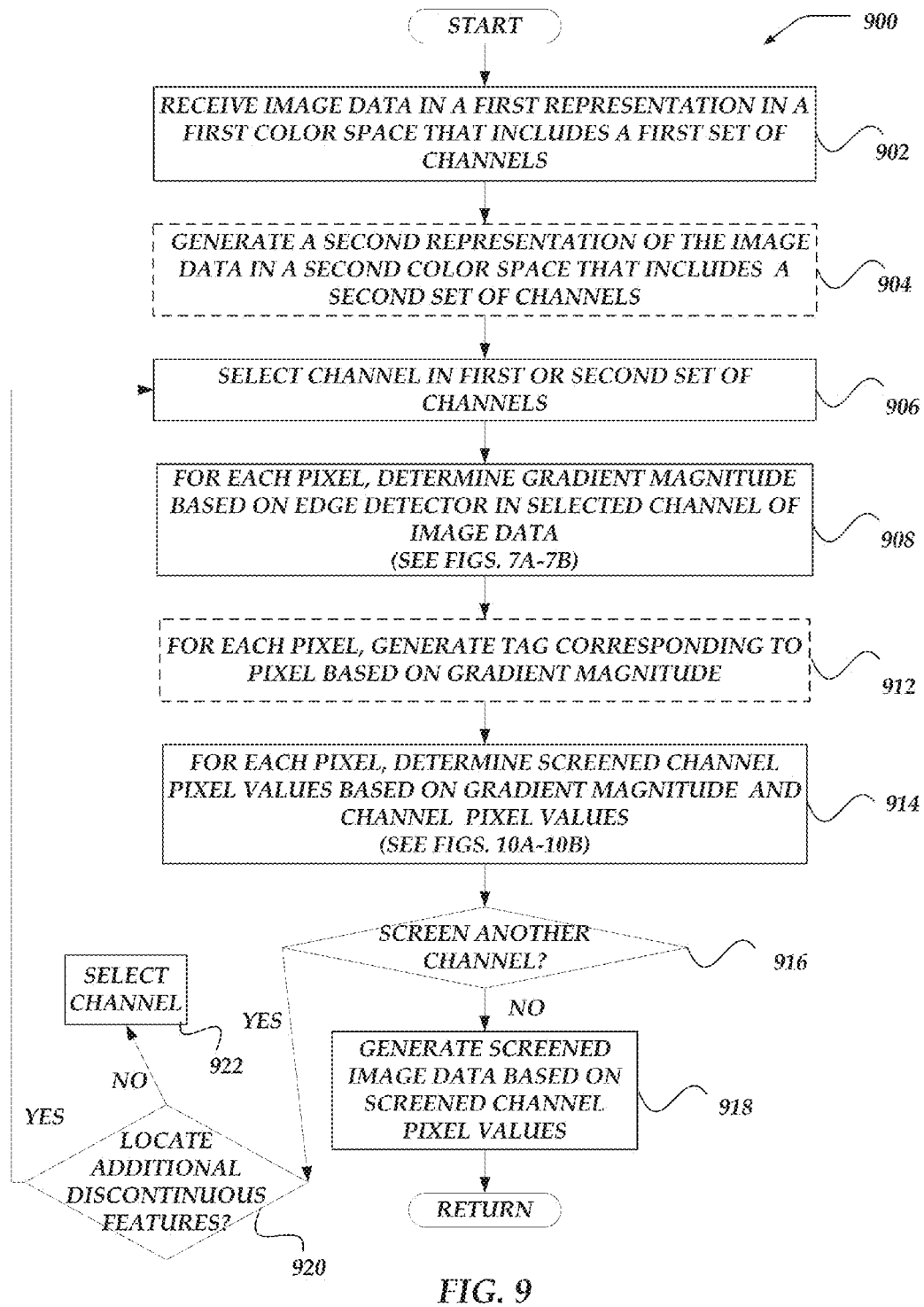
FIG. 9 illustrates a logical flow diagram generally showing another embodiment of an overview process for screening image data that is consistent with the various embodiments disclosed herein.

FIG. 9 illustrates a logical flow diagram generally showing another embodiment of an overview process for screening image data that is consistent with the various embodiments disclosed herein. Process 900 may begin, after a start block, at block 902, where image data is received. The image data may be received in a first representation in a first color space that includes a first set of channels. For instance, the first representation in the first color space may be an additive color space, such as, but not limited to the RGB color space. In such embodiments, the first color space includes 3 channels: the Red channel, the Green channel, and the Blue channel. In at least one embodiment, the first representation is in a grayscale color space that may include a single luma channel. Such grayscale image data may represent a grayscale image, such as image 520 of FIG. 5.

In various embodiments, an image-processing device may receive the image data. The image-processing device may be a scanner or multi-function scanner/printer/copier/fax. In at least one embodiment, the image-processing device may be a server device, such as a web server. The image-processing device may receive the data via a network, such as network 108 of FIG. 1. In at least one embodiment, the image-processing device may capture the image data via a camera or scanner included in the image-processing device, such as camera 466 or scanning assembly 456 of image-processing device 400 of FIG. 4. In some embodiments, the image data was captured by a camera included in a mobile device, such as mobile devices 103-105 of FIG. 1. Accordingly, in some embodiments, the image data was captured by a scanner, camera, or other photosensitive device included in a network device that is separate from the image-processing device.

At optional block 904, a second representation of the image data may be generated. In some embodiments, the second representation may be in a second color space that includes a second set of channels. In at least one embodiment, the second color space may be a grayscale, or other, color space that includes a luma channel. In some embodiments, the second color space may be a subtractive color space, such as a CMYK color space. Various methods and/or processes may be used to generate the second representation of the image data based on the channel pixel values of the first representation of the image data in the first color space.

In some embodiments, a second representation of the image data is not generated at block 904. The screening process 900 may be performed in the first color space of the received image data. In other embodiments, a luma channel for the image data is generated based on the representation of the image data in the first color space. In at least some embodiments, the image data received in block 902 may be represented in a subtractive color space, or a color space that includes a luma channel. In such embodiments, generating a second representation of the image data may not be required.

At block 906, a channel is selected. In at least one embodiment, one or more channels may be selected at block 906. In some embodiments, the selected channel is a channel from the second set of channels of the second color space. In at least one embodiment, the selected channel may be from the first set of channels of the first color space. In some embodiments, the selected channel is a luma channel of either the first or the second color space. The selected channel may be a chrominance channel of either the first or the second color space.

At block 908, for each pixel in the image data, one or more gradient magnitudes are determined in the selected channel. The gradient magnitude for the image pixels may be determined based on one or more edge detectors or other discontinuous feature detectors. In various embodiments, discontinuous features, such as but not limited to edges, ridges, valleys, quickly changing colors or luminance, or other sharply defined or sharply contrasting features in the image data may result in relatively large gradient magnitudes. Various embodiments for determining gradient magnitudes for image pixels are described in the context of processes 700 and 740 of FIGS. 7A-7B. It should be noted that although edge location is discussed throughout, other discontinuous features, such as ridges may be similarly located via similar discontinuous feature detection operators, kernels, matrices, and the like.

In optional block 912, one or more tags are generated for each of the pixels. The one or more tags corresponding to a particular pixel are generated based one the pixel gradient. The tag may be based on the choice of the gradient threshold for the particular type of discontinuous feature. The tag may be based on a comparison between the gradient magnitude and the gradient threshold for the particular type of discontinuous feature.

At block 914, one or more screened channel pixel values may be determined for each of the pixels. The screened channel pixel values for a particular pixel may be determined based on the gradient magnitude for the particular pixel. In some embodiments, the screened channel pixel values are determined based on the one or more tags corresponding to the particular pixel. Processes 1000 and 1040 of FIGS. 10A and 10B respectively discuss various embodiments of processes for determining screened channel pixel values.

However, briefly, as discussed above, separate screens may be associated and/or applied to pixels included in or near discontinuous features, such as edges. For instance, a discontinuous screen may be employed to determine the screened pixel values of pixels included in discontinuous regions of the image data. Similarly, a continuous screen may be employed to determine the screened pixel values included in continuous regions of the image data. In various embodiments, a discontinuous screen may include an error diffusion screen or a threshold screen. Also, in the various embodiments, a continuous screen may include a clustered dot screen, such as a halftone screen. The screened channel pixel values may be based on the choice of the gradient threshold for the particular type of discontinuous feature. The screened channel pixel values may be based on a comparison between the gradient magnitude and the gradient threshold for the particular type of discontinuous feature.

At decision block 916, it is determined whether another channel is to be screened. If another channel is to be screened, process 900 flows to decision block 920. Otherwise, process 900 flows to block 918.

At decision block 920, it is determined whether additional discontinuous features are to be determined, such that the selectively screening performed on the next channel is based on discontinuous features located in the next channel to be screened. If so, process 900 returns to block 906, where another channel is selected, such that additional discontinuous features are located in the newly selected channel. Otherwise, process 900 proceeds to block 922, where another channel is selected. From block 922, process 900 returns to block 914, to screen the pixels of the channel selected at block 922 based on the previously located discontinuous features.

At block 918, the screened image data is generated based on the screened channel pixel values. In various embodiments, the screened channel pixel values are of a reduced pixel depth compared to the channel pixel values. The screened image data includes the screened channel pixel values. Because discontinuous and continuous screens where selectively applied to the pixels, based on a gradient magnitude and a gradient threshold, the screened image data better represents and renders the image. Process 900 may terminate and/or return to a calling process to perform other actions.

Figure 10A:
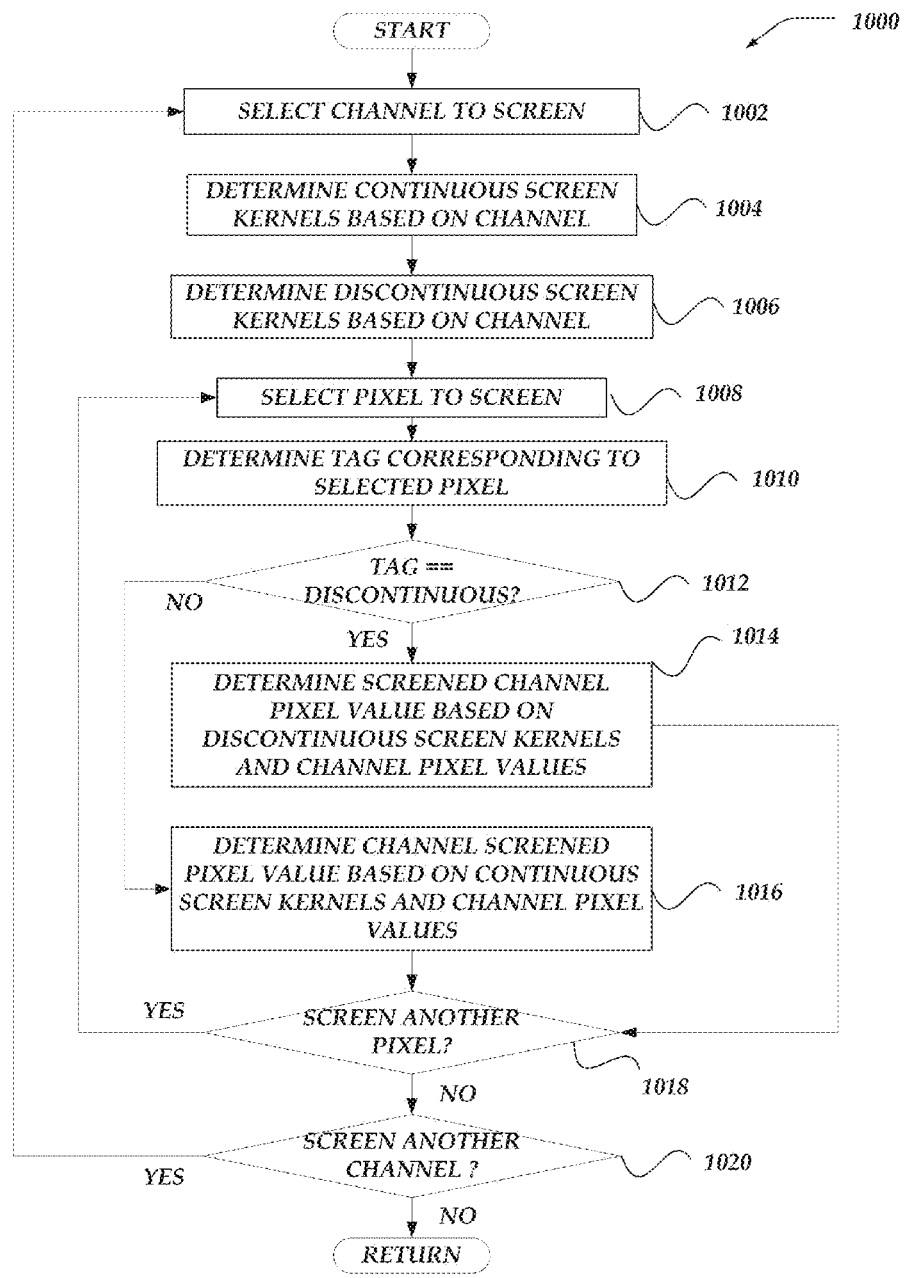
FIG. 10A illustrates a logical flow diagram generally showing an embodiment of a process for determining screened channel pixel values based on the pixel values and the tags corresponding to the pixel.

FIG. 10A illustrates a logical flow diagram generally showing an embodiment of a process for determining screened channel pixel values based on the pixel values and the tags corresponding to the pixel. After a start block, process 1000 proceeds to block 1002, where a channel to be screened is selected.

At block 1004, one or more continuous screen kernels are determined. In various embodiments, the one or more continuous screen kernels are based on the selected channel. For instance, the continuous screen kernel may be rotated relative to other channels, as discussed above. Accordingly, separate continuous screens may be determined for separate channels. In various embodiments, a continuous screen kernel may include, but is not other limited to a point conversion kernel, such as an ordered dither matrix. Such ordered dither matrices may include a clustered dot matrix, such as a halftone dithering matrix.

A resolution of the screen may be determined at block 1004. For instance, a size of the kernel is determined at block 1004. The size may be based on the selected channel. The kernel or matrix may be tiled across and down the image. The screen depth may match the image depth.

At block 1006, one or more discontinuous screen kernels are determined. In various embodiments, the one or more discontinuous screen kernels are based on the selected channel. For instance, the discontinuous screen kernel may be rotated relative to other channels, as discussed above. Accordingly, separate continuous screens may be determined for separate channels.

In various embodiments, the discontinuous screen kernels may include an error-diffusing kernel or a combined screen and error-diffusing kernel. Briefly, in contrast to a point conversion kernel, such as a clustered dot matrix, an error-diffusing kernel, distributes the quantization round off errors to neighboring pixels. Accordingly, an error-diffusing kernel is an area operation because the pixel values for one pixel affect the screen pixel values for neighboring pixels. As discussed above, such error diffusion screening kernels tend to enhance discontinuous features in the screened image. Accordingly, the screened image will include sharper and more defined edges, ridges, valleys, and the like.

Error diffusing kernels quantize the screened pixel values using a neighborhood (or area) operator, in contrast to pointwise operation of an ordered dithering matrix. The neighborhood operation diffuses the quantization errors to neighboring pixels. Depending upon the choice of the kernel, the quantization errors may be "pushed" forward or "pulled" backwards. Accordingly, error-diffusion provides feedback amongst contiguous pixels in the screening process, resulting in more clearly defined discontinuous features in the screened image data.

In various embodiments, a discontinuous screen kernel may include, but is not other limited to various Floyd-Steinberg kernels, Jarvis-Judice-Ninke kernels, Stucki kernels, Burkes kernels, Sierra kernels, two-row Sierra kernels, fliter life kernels, Atkinson kernels, and the like.

In one exemplary, but non-limiting, embodiment, the discontinuous screen kernel may include the error diffusing kernel shown below $$\frac{1}{16}\begin{bmatrix} - & \# & 7 \\ 3 & 5 & 1 \end{bmatrix}$$

Where - denotes a pixel where the screed channel pixel values have already been determined, and the # denotes the pixel where the screened channel pixel values are being determined via the kernel. The numerical values indicate the normalized distribution of the quantization error to the neighboring pixels.

Another non-limiting example of an error diffusing kernel is shown below. The below kernel distributes the quantization error to a larger neighborhood.

$$\frac{1}{48}\begin{bmatrix} - & - & \# & 7 & 5 \\ 3 & 5 & 7 & 5 & 3 \\ 1 & 3 & 5 & 3 & 1 \end{bmatrix}$$

In at least some embodiments, a threshold matrix may be included in the discontinuous screen kernel. A threshold matrix may be a point conversion matrix. The particular threshold value may be a constant threshold, or may be dynamically updated based on pixel location, pixel values, gradients, and the like.

At block 1008, a pixel, or set of contiguous pixels, to be screened is selected for. In various embodiments, the size and geometry of the selected set of pixels may be based on at least one of the size of the continuous or the discontinuous screen kernel. For instance, if the continuous screen kernel is to be applied, the selected set of pixels may be an N×N sub-array of contiguous pixels to match the N×N continuous screen kernel. A similar selection of a set of pixels may apply for the application of the discontinuous screen kernel.

At block 1010, the tag corresponding to the selected pixel is determined. The corresponding tag may have been generated at optional block 912 of FIG. 9. The tag may indicate if the pixel is included in a discontinuous region of the data or if the pixel is included in a continuous region of the pixel.

At decision block 1012, it is determined if the tag indicates that the pixel is included in a discontinuous region of the image data. If so, the one or more discontinuous screen kernels are selectively associated with the pixel. Process 1000 then flows to block 1014. Otherwise, if the pixel is included in a continuous region, the one or more continuous screen kernels are selectively associated with the pixel. Process 1000 then flows to block 1016.

In block 1014, one or more screened channel pixel values are determined based on the selectively associated discontinuous screen kernel and the channel pixel values of the selected pixel. When the discontinuous screen kernel includes an area operator, such as an error diffusing matrix, the determination of the screened channel pixel values is further based on at least a portion of the neighboring pixels.

In the various embodiments, the selectively associated discontinuous screen kernel operates on the selected pixel and (if the kernel is an error-diffusing kernel), at least a portion of the neighboring pixels. The determination of the screened channel pixel values is based on the matrix operation on the pixels. Thus, at block 1014, the associated discontinuous screen kernels may be tiled over the discontinuous regions of the image data. Furthermore, the type of discontinuous screen may be dynamically adjusted to accommodate various discontinuous feature types, such as edges, valleys, and the like. Process 1000 next flows to block 1018.

In block 1016, one or more screened channel pixel values are determined based on the selectively associated continuous screen kernel and the channel pixel values of the selected pixel. In the various embodiments, the selectively associated continuous screen kernel operates on the selected pixel. In the case of a point conversion screen kernel, the operation may be a simple threshold operation, where the threshold is determined by the matrix element corresponding to the pixel. The determination of the screened channel pixel values is based on the matrix operation on the pixels. Thus, at block 1016, the associated continuous screen kernels may be tiled over the continuous regions of the image data. Furthermore, the type of continuous screen may be dynamically adjusted to accommodate various continuous feature types, such as constant color regions, smoothly changing regions, and the like. Process 1000 next flows to block 1018.

At decision block 1018, it is determined whether another pixel is to be screened within the channel. If so, process 1000 returns to block 1008. Otherwise, process 1000 flows to decision block 1020. At decision block 1020, it is determined whether another channel is to be screened. If so, process 1000 returns to block 1002. Otherwise, process 1000 may terminate and/or return to a calling process to perform other actions.

Figure 10B:
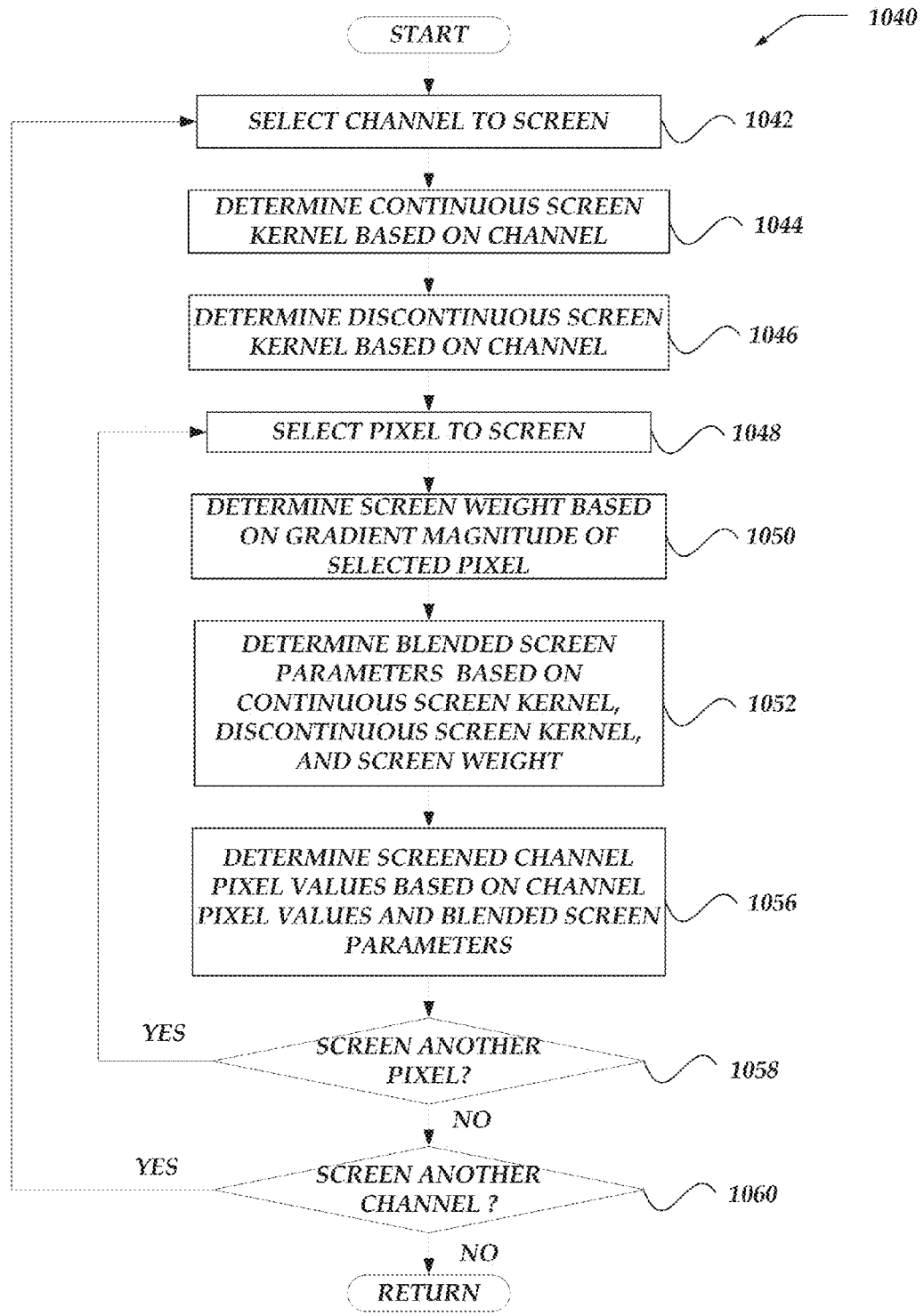
FIG. 10B illustrates a logical flow diagram generally showing an embodiment of a process for determining screened channel pixel values based on the pixel values and the gradient of the pixel.

FIG. 10B illustrates a logical flow diagram generally showing an embodiment of a process for determining screened channel pixel values based on the pixel values. After a start block, process 1040 proceeds to block 1042, where a channel to be screened is selected. Selecting a channel to be screened at block 1042 may be similar to selecting a channel at block 1002 of process 1000.

At block 1044, a continuous screen kernel is determined based on the selected channel. In various embodiments, determining a continuous screen kernel at block 1044 may be similar to determining a continuous screen kernel at block 1004 of process 1000. At block 1046, a discontinuous screen kernel is determined based on the selected channel. In various embodiments, determining a discontinuous screen kernel at block 1046 may be similar to determining a discontinuous screen kernel at block 1006 of process 1000. At block 1048, a pixel, or a set of contiguous pixels, is selected to be screened. Selecting a pixel at block 1048 may be similar to selecting a pixel at block 1008 of process 1000.

At block 1050, a screen weight is determined. The screen weight may be based on a gradient magnitude for the selected pixel. For instance, the gradient magnitude may be determined at block 908 of process 900 of FIG. 9. The screen weight may be a linear function of the gradient magnitude. The screen weight may be a non-linear function of the gradient magnitude, such as an exponential or logarithmic function. The determined screen weight may be determined such that the discontinuous screen is more heavily weighted for larger gradients and the continuous screen is more heavily weighted for smaller gradients.

At block 1052, one or more blended screen parameters are determined. The blended screen parameters may be based on at least one of the continuous screen kernel, the discontinuous screen kernel, and the screen weight. In at least one embodiment, a blended screen kernel is determined based on a blending of the continuous screen kernel and the discontinuous screen kernel. The blending of the continuous screen kernel may be based on the screen weight. For instance, the blending may include an additive combination, multiplicative combination, or the like At block 1056, one or more channel screened pixel values are determined based on the channel pixel values and the blended screen parameters. In at least one embodiment, the channel screened pixel values may be determined based on the blended screen kernel.

At decision block 1058, it is determined whether another pixel is to be screened within the channel. If so, process 1040 returns to block 1048. Otherwise, process 1040 flows to decision block 1060. At decision block 1060, it is determined whether another channel is to be screened. If so, process 1040 returns to block 1042. Otherwise, process 1040 may terminate and/or return to a calling process to perform other actions.

Use Case Illustrations

Figure 11B:
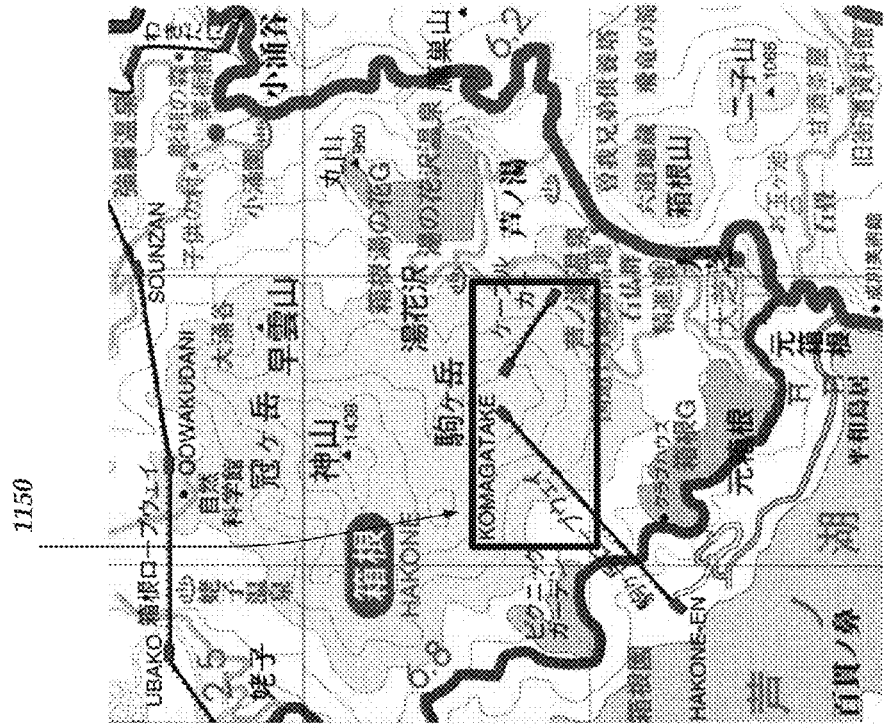
FIG. 11B shows a second screened image, where the screened image data was generated from the same image data of FIG. 11A, however a combination of halftone and error diffusion screens, consistent with the various embodiments disclosed herein, was selectively employed to generate the screened image data.
Figure 11A:
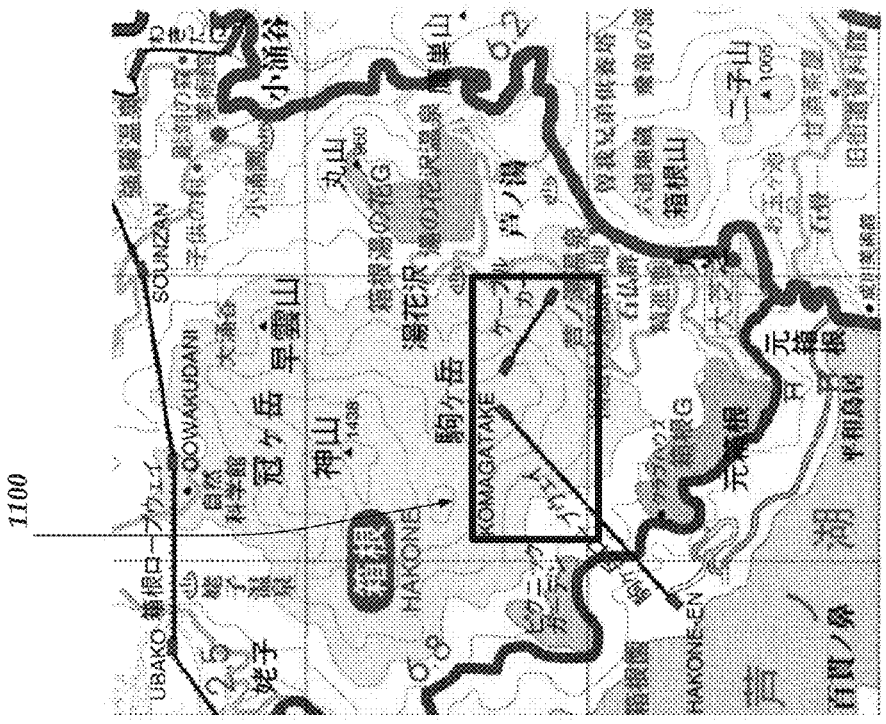
FIG. 11A shows a first screened image that includes discontinuous features, where a single halftone screen was employed to generate the screened image data.

FIG. 11A shows a first screened image that includes discontinuous features, where a single halftone screen was employed to the associated set of image data to generate the screened image data representing the first screened image. FIG. 11A shows a zoom-box 1100.

FIG. 11B shows a second screened image, where the screened image data was generated from the same image data that generated the first screened image of FIG. 11A, however a combination of halftone and error diffusion screens, consistent with the various embodiments disclosed herein, was selectively employed to generate the screened image data representing the second screened image. FIG. 11B shows a zoom-box 1150. A visual comparison of FIG. 11A and FIG. 11B demonstrates the advantages of selectively employing separate screens to separate regions of the image data.

Figure 12A:
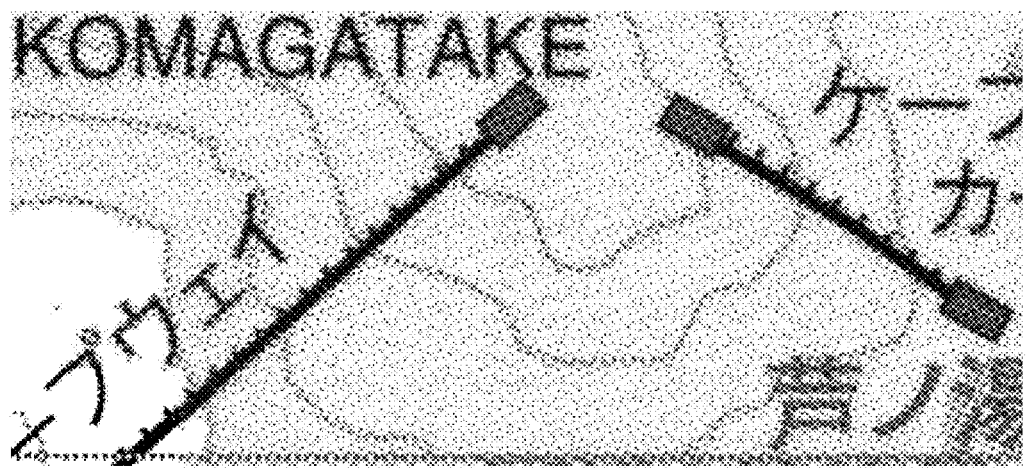
FIG. 12A shows a zoomed-in view of a region of the screened image of FIG. 11A, where a single halftone screen was employed to generate the screened image data.

FIG. 12A shows a zoomed-in view of a region of the first screened image of FIG. 11 A that includes some of the discontinuous features of the first screened image of FIG. 11A, where a single halftone screen was employed to generate the screened image data representing the discontinuous features of the first screened image of FIGS. 11A and 11B. The zoom-in box 1100 of FIG. 11A encompasses the region of the first screened image shown in FIG. 12A.

Figure 12B:
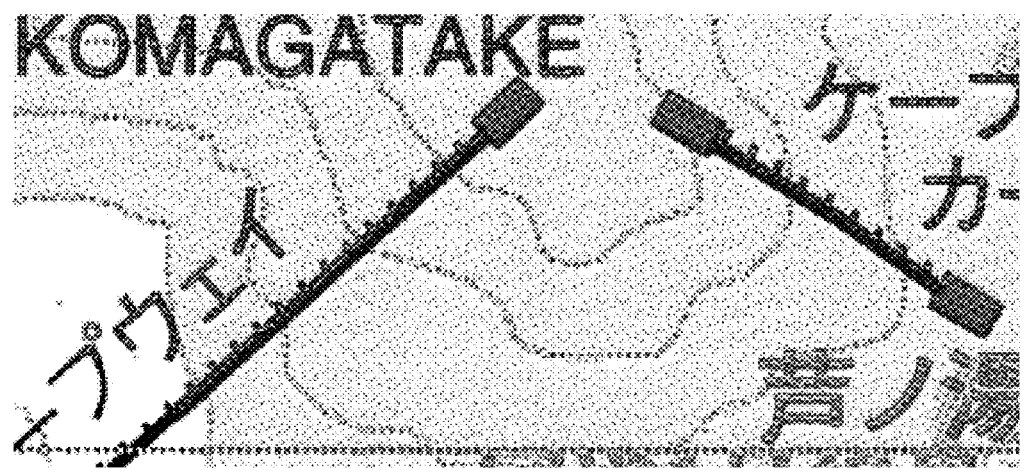
FIG. 12B shows a zoomed-in view of the second screened image of FIG. 11B, where a combination of halftone screens and error diffusion screens was selectively employed to generate the screened image data.

FIG. 12B shows a zoomed-in view of the second screened image of FIG. 11B that includes the same discontinuous features shown in the zoomed-in view FIG. 12A, where a combination of halftone screens and error diffusion screens was selectively employed to generate the screened image data representing the second screened image of FIGS. 11B and 12B. The zoom-in box 1150 of FIG. 11B encompasses the region of the second screened image shown in FIG. 12B. A visual comparison of FIG. 12A and FIG. 12B demonstrates the advantages of selectively employing separate screens to separate regions of the image data.

It will be understood that each block of the flowchart the illustrations, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Additionally, in one or more steps or blocks, may be implemented using embedded logic hardware, such as, an Application Specific Integrated Circuit (ASIC), Field Programmable Gate Array (FPGA), Programmable Array Logic (PAL), or the like, or combination thereof, instead of a computer program. The embedded logic hardware may directly execute embedded logic to perform actions some or all of the actions in the one or more steps or blocks. Also, in one or more embodiments (not shown in the figures), some or all of the actions of one or more of the steps or blocks may be performed by a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A method for processing image data for printing by a printing device, comprising:
   receiving the image data;
   employing an edge detector to determine when one or more edges are located in one or more regions of the image data;
   when one or more edges is detected in one or more regions of the image data, iteratively performing actions for each pixel in the one or more regions of the image data, including:
      determining a gradient of a pixel in the one or more regions of image data;
      comparing the gradient of the pixel to a first screen threshold, wherein a first screen is selected for the pixel having an affirmative comparison to the selected first screen threshold and a second screen is selected for the pixel having a negative comparison to the first screen threshold;
      for the pixel having the affirmative comparison, determining one or more screened pixel values based on one or more pixel values included in the pixel and the first selected screen; and
      for the pixel having the negative comparison, determining the one or more screened pixel values based on one or more pixel values included in the pixel and the second selected screen; and
   generating screened image data based on the one or more screened pixel values, wherein the screened image data is employed to print an screened image at the printing device.

2. The method of claim 1, wherein employing an edge detector further comprises generating a representation of the image data in a color space for detecting one or more edges located in one or more regions of the image data.

3. The method of claim 1, wherein employing an edge detector further comprises generating a representation of the image data in one or more luma channels for detecting one or more edges located in one or more regions of the image data.

4. The method of claim 1, wherein the first screen is one of: an error diffusion screen or a threshold screen.

5. The method of claim 1, wherein the second screen is a halftone screen.

6. The method of claim 1, wherein the method further comprises:
   determining a halftone dot resolution of the image data based on one or more tone continuities of the image data; and
   determining a coarseness of the edge detector based on the halftone dot resolution;
   determining one or more edge kernels based on the coarseness of the edge detector; and
   locating the one or more edges in the image data based on the one or more edge kernels and one or more pixel values of each of the pixels in the one or more regions of the image data.

7. The method of claim 1, further comprising:
   determining one or more screening weights based on the gradient of the pixel; and
   determining the one or more screened pixel values based on the first screen, the second screen, the one or more screening weights and one or more other pixel values included in one or more neighboring pixels of the pixel.

8. The method of claim 1, wherein the method further comprising:
   for at least a portion of the pixels in the one or more regions of the image data, determining one or more vertical gradients based on a convolution of a vertical edge kernel with the one or more pixel values included the portion of the pixels;
   for the portion of the pixels, determining one or more horizontal gradients based on a convolution of a horizontal edge kernel with the one or more pixel values included in the portion of the pixels;
   for the portion of the pixels, determining one or more gradient magnitudes based on a combination of the one or more vertical gradients and the one or more horizontal gradients;
   locating the one or more edges based on the one or more gradient magnitudes and a second screen threshold.

9. The method of claim 1, further comprising:
   receiving the image data in a first representation in an additive color space;
   generating a second representation of the image data in a subtractive color space; and
   generating the screened image data, wherein the screened image data is represented in the subtractive color space.

10. An integrated circuit for processing image data for printing by a printing device, comprising:
    an input circuit to receive the image data;
    an edge detector for determining when one or more edges are located in one or more regions of the image data;
    a logic circuit for performing actions, including:
       when one or more edges is detected in one or more regions of the image data, iteratively performing actions for each pixel in the one or more regions of the image data, including:
          determining a gradient of a pixel in the one or more regions of image data and a closest edge of the one or more edges;
          comparing the gradient of the pixel to a first screen threshold, wherein a first screen is selected for the pixel having an affirmative comparison to the selected first screen threshold and a second screen is selected for the pixel having a negative comparison to the first screen threshold;
          for the pixel having the affirmative comparison, determining one or more screened pixel values based on one or more pixel values included in the pixel and the first selected screen; and
          for the pixel having the negative comparison, determining one or more screened pixel values based on one or more pixel values included in the pixel and the second selected screen; and an output circuit to generate screened image data based on the one or more screened pixel values, wherein the screened image data is employed to print an screened image at the printing device.

11. The integrated circuit of claim 10, wherein employing an edge detector further comprises generating a representation of the image data in a color space for detecting one or more edges located in one or more regions of the image data.

12. The integrated circuit of claim 10, wherein employing an edge detector further comprises generating a representation of the image data in one or more luma channels for detecting one or more edges located in one or more regions of the image data.

13. The integrated circuit of claim 10, wherein the first screen is one of: an error diffusion screen or a threshold screen.

14. The integrated circuit of claim 10, wherein the second screen is a halftone screen.

15. The integrated circuit of claim 10, wherein the method further comprises:
- determining a halftone dot resolution of the image data based on one or more tone continuities of the image data; and
- determining a coarseness of the edge detector based on the halftone dot resolution;
- determining one or more edge kernels based on the coarseness of the edge detector; and
- locating the one or more edges in the image data based on the one or more edge kernels and one or more pixel values of each of the pixels in the one or more regions of the image data.

16. The integrated circuit of claim 10, further comprising:
- determining one or more screening weights based on the gradient of the pixel; and
- determining the one or more screened pixel values based on the first screen, the second screen, the one or more screening weights and one or more other pixel values included in one or more neighboring pixels of the pixel.

17. The integrated circuit of claim 10, wherein locating the one or more edges includes:
- for at least a portion of the pixels in the one or more regions of the image data, determining one or more vertical gradients based on a convolution of a vertical edge kernel with the one or more pixel values included the portion of the pixels;
- for the portion of the pixels, determining one or more horizontal gradients based on a convolution of a horizontal edge kernel with the one or more pixel values included in the portion of the pixels;
- for the portion of the pixels, determining one or more gradient magnitudes based on a combination of the one or more vertical gradients and the one or more horizontal gradients;
- locating the one or more edges based on the one or more gradient magnitudes and a second screen threshold.

18. The integrated circuit of claim 10, further comprising:
- receiving the image data in a first representation in an additive color space;
- generating a second representation of the image data in a subtractive color space; and
- generating the screened image data, wherein the screened image data is represented in the subtractive color space.

19. A printer device that processes image data for printing, comprising:
- an input circuit to receive the image data;
- an edge detector for determining when one or more edges are located in one or more regions of the image data;
- a logic circuit for performing actions, including:
  - when one or more edges is detected in one or more regions of the image data, iteratively performing actions for each pixel in the one or more regions of the image data, including:
    - determining a distance between a pixel in the one or more regions of image data and a closest edge of the one or more edges;
    - comparing the gradient of the pixel to a first screen threshold, wherein a first screen is selected for the pixel having an affirmative comparison to the selected first screen threshold and a second screen is selected for the pixel having a negative comparison to the first screen threshold;
    - for the pixel having the affirmative comparison, determining one or more screened pixel values based on one or more pixel values included in the pixel and the first selected screen; and
    - for the pixel having the negative comparison, determining one or more screened pixel values based on one or more pixel values included in the pixel and the second selected screen; and
- an output circuit to generate screened image data based on the one or more screened pixel values; and
- a printing assembly that is employed to print an screened image based on the screened image data.

20. The printer device of claim 19, wherein employing an edge detector further comprises one or more of:
- generating a representation of the image data in a color space for detecting one or more edges located in one or more regions of the image data; or
- generating a representation of the image data in one or more luma channels for detecting one or more edges located in one or more regions of the image data.

* * * * *